United States Patent
Kulesha

(10) Patent No.: US 8,840,355 B1
(45) Date of Patent: Sep. 23, 2014

(54) AUTOMATED SLING LOAD HANDLER FOR AN AIRCRAFT

(75) Inventor: Richard L. Kulesha, Bear, DE (US)

(73) Assignee: The Boeing Company, Chicago, IL (US)

(*) Notice: Subject to any disclaimer, the term of this patent is extended or adjusted under 35 U.S.C. 154(b) by 579 days.

(21) Appl. No.: 12/856,726

(22) Filed: Aug. 16, 2010

(51) Int. Cl.
*B66C 1/00* (2006.01)

(52) U.S. Cl.
USPC .......................... 414/626; 414/785; 294/81.21

(58) Field of Classification Search
USPC .......... 212/273; 414/619, 626, 785; 294/81.2, 294/81.21, 81.54, 81.51, 81.6–81.62, 67.3, 294/67.31, 67.33; 244/137.4
See application file for complete search history.

(56) References Cited

U.S. PATENT DOCUMENTS

| | | | |
|---|---|---|---|
| 3,068,034 A | 12/1962 | Campbell | |
| 3,249,064 A * | 5/1966 | Barry | 104/93 |
| 3,561,809 A | 2/1971 | Harding | |
| 3,602,375 A * | 8/1971 | Martinson | 212/198 |
| 3,690,602 A | 9/1972 | Marsh | |
| 3,845,937 A | 11/1974 | Johnson et al. | |
| 4,592,692 A * | 6/1986 | Suizu et al. | 414/792.8 |
| 5,088,783 A * | 2/1992 | Squires | 294/81.54 |
| 5,560,663 A * | 10/1996 | Hara et al. | 294/81.41 |
| 6,375,124 B1 * | 4/2002 | Gabriel | 244/137.4 |
| 2005/0225104 A1* | 10/2005 | Lim et al. | 294/81.1 |
| 2006/0043748 A1* | 3/2006 | Stinis et al. | 294/81.51 |

* cited by examiner

*Primary Examiner* — Jonathan Snelting
(74) *Attorney, Agent, or Firm* — Yee & Associates, P.C.

(57) ABSTRACT

A method and apparatus for handling cargo. A cargo handling system may be positioned relative to the cargo. The cargo handling system may comprise a frame structure and an engagement system. The frame structure may be configured to change in a number of dimensions to encompass the cargo. The engagement system may be configured to engage the cargo. The number of dimensions of the frame structure may be adjusted to encompass the cargo. The cargo may be engaged with the engagement system.

18 Claims, 25 Drawing Sheets

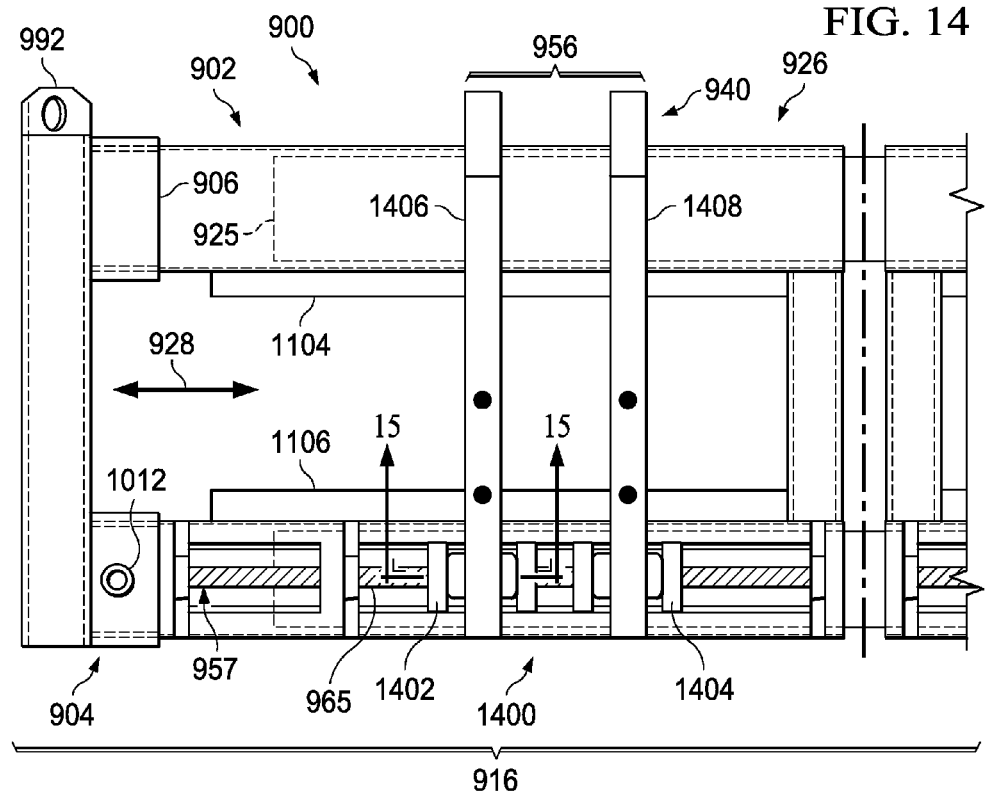
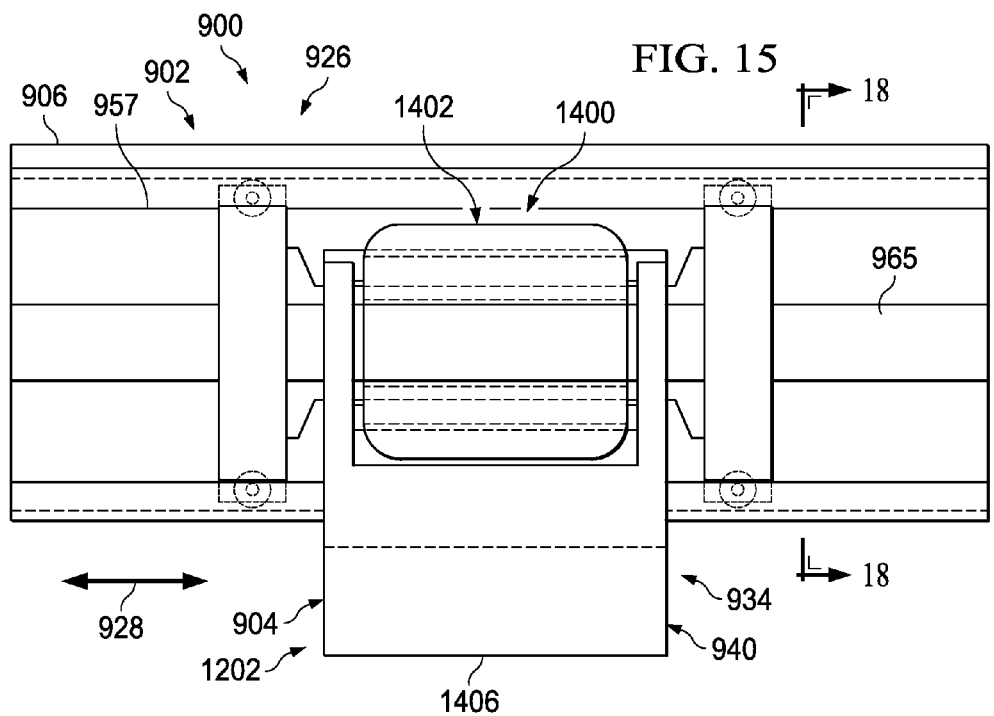

AUTOMATED SLING LOAD HANDLER FOR AN AIRCRAFT

GOVERNMENT LICENSE RIGHTS

This application was made with Government support under contract number W911W6-08-2-0014 awarded by the United States Army. The Government has certain rights in this application.

BACKGROUND INFORMATION

1. Field

The present disclosure relates generally to aircraft and, in particular, to a method and apparatus for moving cargo using aircraft. Still more particularly, the present disclosure relates to a method and apparatus for handling cargo in a sling beneath an aircraft.

2. Background

In addition to carrying passengers, aircraft may also be used to move cargo from one location to another location. Some aircraft may carry cargo within the fuselage of the aircraft. These types of aircraft may have a nose or tail section that may open to allow cargo to be moved in and out of the aircraft. Other types of aircraft may have a door on the side of the fuselage that allows cargo to be moved in and out of the aircraft.

In other cases, the cargo may not be easily placed within the fuselage of an aircraft. With this type of cargo, one or more slings may be used to move the cargo. For example, containers, pallets, vehicles, and/or other types of cargo may be carried on a sling from one location to another location. With this type of cargo, the aircraft may take the form of a helicopter.

Attaching cargo to a sling of an aircraft may require manpower and time. For example, with a sling, the sling may be attached to a helicopter and the cargo. This process may require the sling to be placed and secured to the cargo. Two or three persons on the ground may provide the operations needed to move the sling and cargo in place relative to each other. This type of loading of cargo on a sling also may require an operator in the aircraft to position the aircraft in response to guidance from personnel on the ground to attach the sling to the cargo.

This type of process may require more personnel and/or time than desired. When the cargo is moved to the destination location, a similar number of steps may be performed to place the cargo on the ground at the destination and to detach the cargo from the sling.

Thus, it would be advantageous to have a method and apparatus that takes into account at least some of the issues discussed above, as well as possibly other issues.

SUMMARY

In one advantageous embodiment, an apparatus may comprise a frame structure and an engagement system. The frame structure may be configured to change in a number of dimensions to encompass cargo. The engagement system may be configured to engage the cargo.

In another advantageous embodiment, a cargo handling system for an aircraft may comprise a frame structure, an engagement system, a sensor system, a thruster system, a cable system, and a computer system. The frame structure may be configured to change in a number of dimensions to encompass cargo within an interior area of the frame structure. The frame structure may comprise a frame having the interior area and a motor system. The frame may be configured to change in the number of dimensions. The motor system may be configured to change the number of dimensions of the frame structure. The engagement system may be configured to engage the cargo and hold the cargo within the interior area of the frame structure when the frame structure is moved away from a ground. The engagement system may comprise at least one of a pin system, a forklift system, a hoist system, and an engagement member. The sensor system may be configured to detect a position of the cargo and the frame structure relative to each other. The sensor system may comprise a number of sensors associated with at least one of the frame and the aircraft configured for connection to the frame structure. The number of sensors may comprise at least one of a number of cameras, a number of ultrasonic units, and a number of laser units. The thruster system may be associated with the frame structure. The thruster system may be configured to generate thrust to move the frame structure. The cable system may be configured to connect the frame structure to the aircraft and may comprise a cable and cable hooks. The computer system may be configured to control operation of the frame structure and the engagement system.

In yet another advantageous embodiment, a method may be provided for handling cargo. A cargo handling system may be positioned relative to the cargo. The cargo handling system may comprise a frame structure and an engagement system. The frame structure may be configured to change in a number of dimensions to encompass the cargo. The engagement system may be configured to engage the cargo. The number of dimensions of the frame structure may be adjusted automatically to encompass the cargo. The cargo may be engaged with the engagement system.

In still yet another advantageous embodiment, a method may be provided for transporting cargo with aircraft. A cargo handling system may be positioned relative to the cargo. The cargo handling system may comprise a frame structure and an engagement system. The frame structure may be configured to change in a number of dimensions to encompass the cargo within an interior area of the frame structure. The engagement system may be configured to engage the cargo and hold the cargo within the interior area of the frame structure when the frame structure is moved away from a ground. A size of the interior area of the frame structure relative to the cargo may be detected using a sensor system. The number of dimensions of the frame structure may be changed to encompass the cargo within the interior area of the frame structure and to allow the engagement system to engage the cargo when the cargo is located in the interior area. The cargo may be engaged with the engagement system. The cargo may be lifted away from the ground by the aircraft associated with the cargo handling system. The aircraft may be flown to a destination with the cargo held by the cargo handling system. The cargo may be released from the cargo handling system at the destination.

The features, functions, and advantages may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 14 is an illustration of a partially-exposed view of a portion of a cargo handling system in accordance with an advantageous embodiment;

FIG. 15 is an illustration of a cross-sectional view of a movement system for a forklift unit in accordance with an advantageous embodiment;

DETAILED DESCRIPTION

The different advantageous embodiments recognize and take into account a number of considerations. For example, without limitation, the different advantageous embodiments recognize and take into account that time and personnel may be required to place, set up, attach, and secure cargo to an aircraft. The sequence for loading cargo into an aircraft using a sling may be repeated when the cargo is unloaded.

The different advantageous embodiments recognize and take into account that in some conditions, the time needed to perform these operations may be more consuming than desirable. For example, without limitation, with a natural disaster, such as a fire, vehicles and/or supplies may be needed in areas that may not be reachable by ground vehicles. As a result, aircraft may be used to transport vehicles and/or supplies to these locations using slings. With a forest fire, the time and/or effort needed to load and move cargo to the locations needed may be more than desired. The time taken may result in greater losses.

Thus, the different advantageous embodiments provide a method and apparatus for handling cargo. In one advantageous embodiment, an apparatus may comprise a frame structure and an engagement system. The frame structure may be configured to change in a number of dimensions to encompass cargo within an interior area of the frame. The engagement system may be configured to engage the cargo within the interior area of the frame structure when the frame structure is moved away from the ground.

Figure 1:
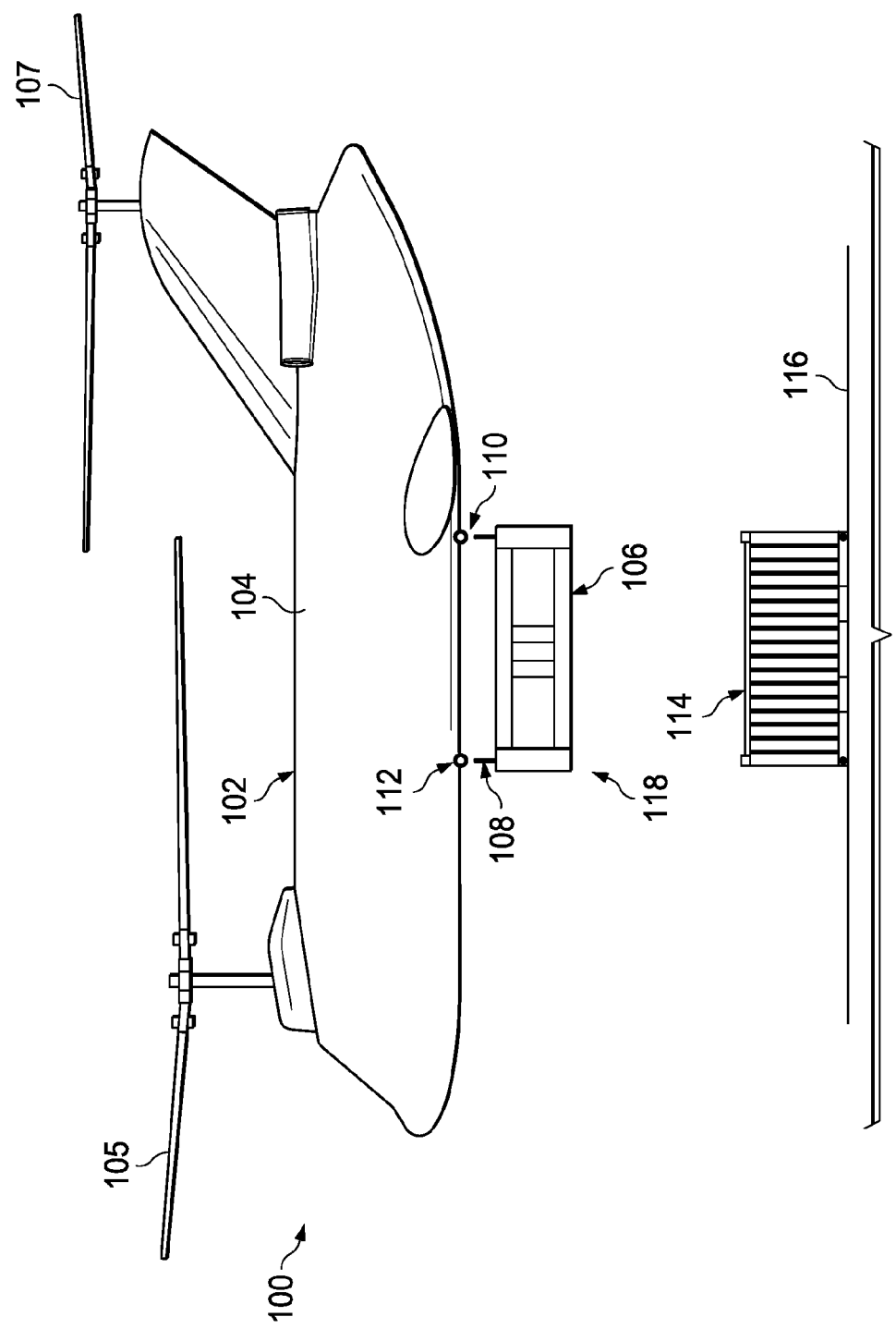
FIG. 1 is an illustration of a cargo handling environment in accordance with an advantageous embodiment.

With reference now to the figures and, in particular, with reference to FIG. 1, an illustration of a cargo handling environment is depicted in accordance with an advantageous embodiment. Cargo handling environment 100 may include aircraft 102 in the form of helicopter 104. Helicopter 104 may have rotors 105, rotors 107, and cargo handling system 106.

In this illustrative example, cargo handling system 106 may be connected to helicopter 104. As used herein, when a first component, such as cargo handling system 106, is connected to a second component, such as helicopter 104, the first component may be connected to the second component without any additional components. The first component also may be connected to the second component by one or more other components. In other words, cargo handling system 106 may be connected to helicopter 104 without any additional components or by one or more other components.

For example, without limitation, cargo handling system 106 may be connected to helicopter 104 using cables 108. In some examples, hooks 110 may be located on helicopter 104 between cables 108 and helicopter 104. In this manner, cargo handling system 106 may be connected to helicopter 104 through cables 108 and hooks 110.

Sensor system 112 may also be part of cargo handling system 106. In these illustrative examples, sensor system 112 may detect cargo 114 on ground 116. As depicted in this example, cargo handling system 106 may be in stored position 118.

Figure 2:
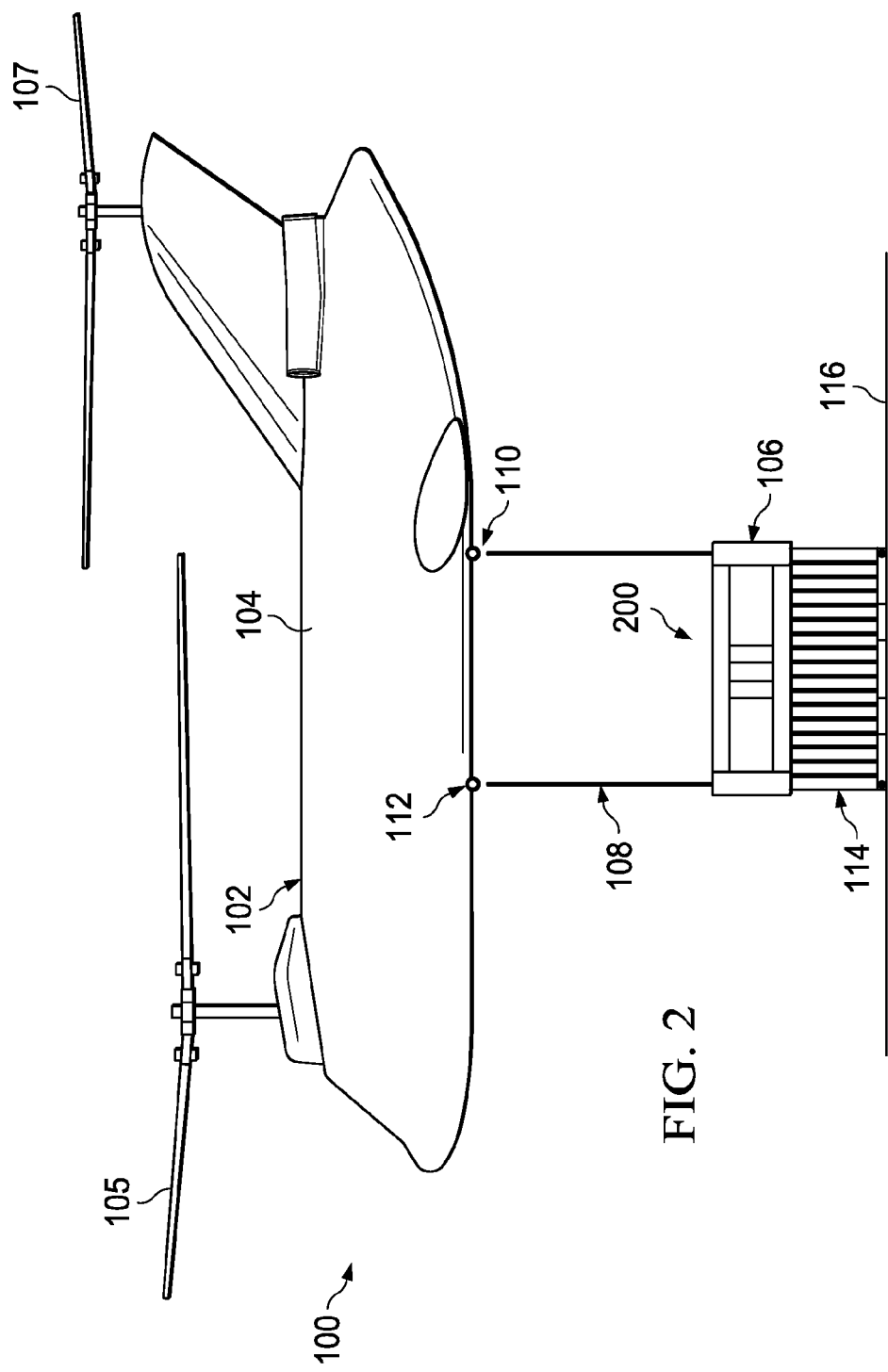
FIG. 2 is an illustration of a cargo handling environment in accordance with an advantageous embodiment.

Turning now to FIG. 2, another illustration of a cargo handling environment is depicted in accordance with an advantageous embodiment. In this illustrative example, cargo handling system 106 may be lowered from stored position 118 in FIG. 1 towards ground 116 to engage cargo 114. As depicted, cargo handling system 106 may be lowered into lowered position 200.

The engagement of cargo handling system 106 with cargo 114 may be performed without requiring operators on ground 116 to manipulate or move cargo handling system 106 into place with respect to cargo 114. When cargo 114 is engaged by cargo handling system 106, helicopter 104 may lift cargo 114 from ground 116 and transport cargo 114 to a destination. In these illustrative examples, cables 108 and cargo hooks 110 may not be retracted into helicopter 104 to lift cargo 114 closer to helicopter 104. Instead, helicopter 104 may provide the lift to raise cargo 114 away from ground 116.

Figure 3:
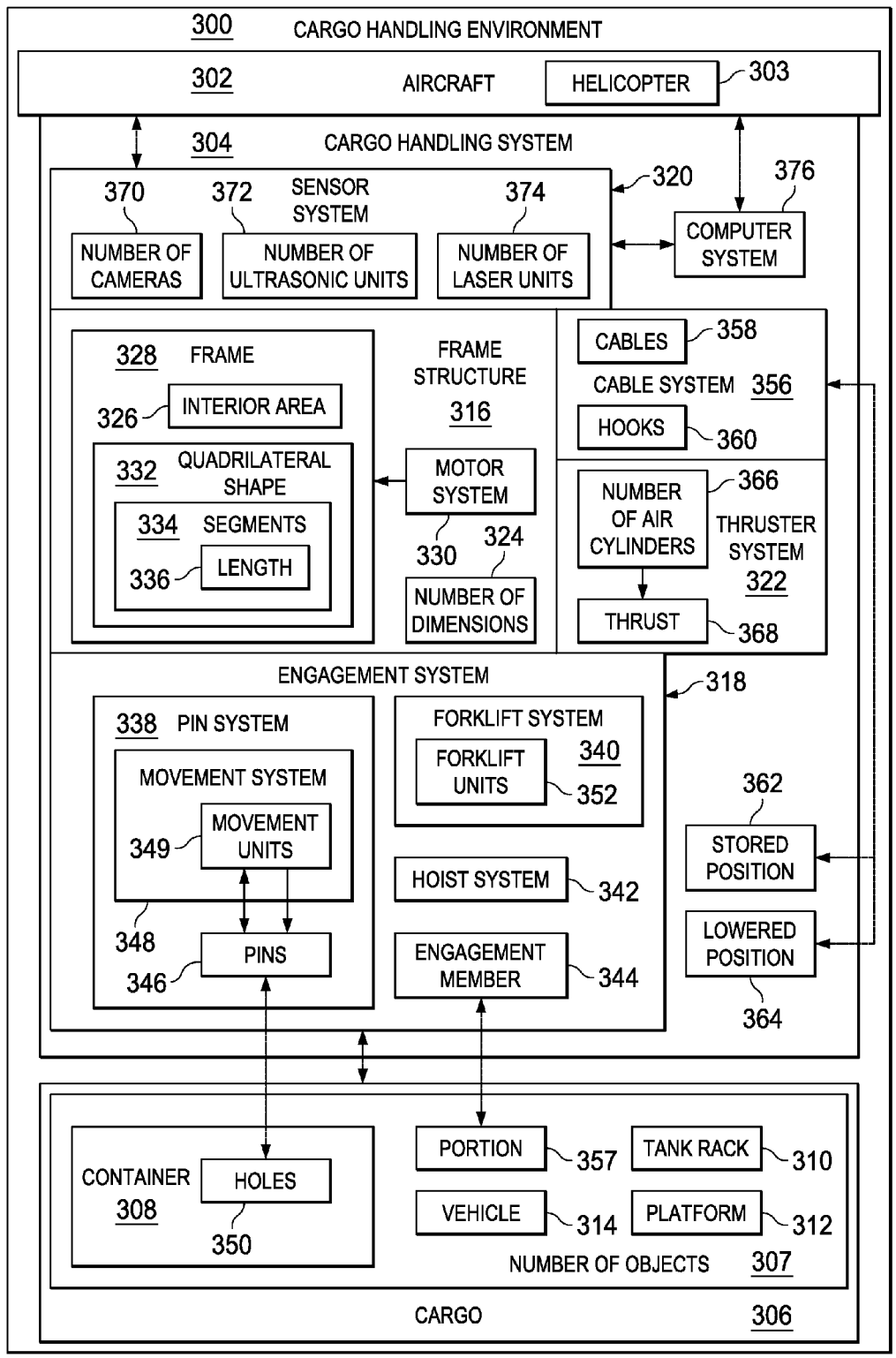
FIG. 3 is an illustration of a cargo handling environment in accordance with an advantageous embodiment.

With reference now to FIG. 3, an illustration of a cargo handling environment is depicted in accordance with an advantageous embodiment. Cargo handling environment 100 in FIGS. 1 and 2 is an example of one implementation for cargo handling environment 300 in FIG. 3.

In this illustrative example, cargo handling environment 300 may include aircraft 302. Aircraft 302 may take the form of helicopter 303 in this depicted example. Aircraft 302 may have cargo handling system 304. Cargo handling system 304 may be used to engage cargo 306. In these illustrative examples, cargo 306 may comprise number of objects 307. Number of objects 307 may take a number of different forms. For example, without limitation, number of objects 307 may include at least one of container 308, tank rack 310, platform 312, vehicle 314, and other suitable types of cargo.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In these illustrative examples, cargo handling system 304 may comprise frame structure 316, engagement system 318, sensor system 320, thruster system 322, and other suitable components. In these examples, the different components in cargo handling system 304 may be associated with each other. A first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or as an extension of the second component.

Frame structure 316 may be configured to change in number of dimensions 324. The change in number of dimensions 324 of frame structure 316 may be performed to encompass cargo 306 within interior area 326 of frame structure 316.

In these illustrative examples, frame structure 316 may include frame 328 and motor system 330. Frame 328 may change in number of dimensions 324 by the operation of motor system 330. For example, without limitation, frame 328 may have quadrilateral shape 332 that encompasses interior area 326. Quadrilateral shape 332 may be formed by segments 334. Motor system 330 may be operated to change length 336 of segments 334 that are substantially parallel to each other in quadrilateral shape 332 to change number of dimensions 324 of interior area 326.

The change in number of dimensions 324 may allow engagement system 318 to engage cargo 306. Engagement system 318 may comprise, for example, without limitation, at least one of pin system 338, forklift system 340, hoist system 342, engagement member 344, and other suitable types of engagement systems.

In these illustrative examples, pin system 338 is an example of one implementation of engagement system 318. As depicted, pin system 338 may comprise pins 346 and movement system 348. Movement system 348 may comprise movement units 349. Each movement unit in movement units 349 may be associated with a pin in pins 346. Movement system 348 may move pins 346 to different locations on frame 328 such that pins 346 may engage cargo 306.

For example, without limitation, when cargo 306 takes the form of container 308, cargo 306 may have holes 350. When cargo 306 is within interior area 326, movement system 348 may move pins 346 on frame structure 316 to locations where pins 346 may engage holes 350. When pins 346 are in position with respect to holes 350, movement units 349 may move pins 346 into holes 350. In this manner, pins 346 may hold cargo 306 in place with respect to frame structure 316.

In yet another illustrative example, forklift system 340 may engage cargo 306. For example, without limitation, if cargo 306 takes the form of platform 312 or vehicle 314, forklift system 340 may be used to engage cargo 306. Forklift system 340 may comprise forklift units 352. Each forklift unit in forklift units 352 may be moved on frame structure 316. The movement of forklift units 352 may be such that forklift units 352 may engage cargo 306 in interior area 326 in frame structure 316. When forklift units 352 engage cargo 306 in interior area 326 in frame structure 316, cargo 306 may be held within interior area 326 in frame structure 316. In yet another illustrative example, hoist system 342 may be connected to cargo 306.

In yet other illustrative examples, engagement member 344 may engage portion 357 of cargo 306 to hold cargo 306 in place with respect to frame structure 316. Engagement member 344 may extend around interior area 326 of frame structure 316. In particular, engagement member 344 may be part of frame structure 316.

Thruster system 322 may aid in positioning frame structure 316 with respect to cargo 306. For example, without limitation, thruster system 322 may comprise number of air cylinders 366 that may be operated to provide thrust 368. Thrust 368 may move frame structure 316 and/or reduce swaying of frame structure 316 on cable system 356.

In these illustrative examples, cable system 356 may connect cargo handling system 304 to aircraft 302. Cable system 356 may comprise cables 358 and hooks 360. Cables 358 and hooks 360 may be retractable on aircraft 302. In other words, cables 358 and hooks 360 may be operated to raise and/or lower cargo handling system 304 relative to aircraft 302 between stored position 362 and lowered position 364. In this manner, cargo handling system 304 may be lowered towards cargo 306 and/or raised towards aircraft 302 away from cargo 306.

Stored position 362 may be any position with respect to aircraft 302 when cargo handling system 304 is not in use. Lowered position 364 may be any position with respect to aircraft 302 such that cargo handling system 304 may be used to engage cargo 306. In other words, in lowered position 364, cables 358 and/or hooks 360 may or may not be fully extended with respect to aircraft 302. In some illustrative examples, cables 358 and/or hooks 360 may always be fully extended such that cargo handling system 304 has only one position. In other words, stored position 362 and lowered position 364 may be the same position for cargo handling system 304.

In these illustrative examples, sensor system 320 may be used to detect cargo 306. Sensor system 320 may be configured to provide information needed to operate cargo handling system 304 to engage cargo 306. In these illustrative examples, sensor system 320 may comprise at least one of number of cameras 370, number of ultrasonic units 372, number of laser units 374, and other suitable types of sensors. Sensor system 320 may be associated with frame structure 316. In addition, sensor system 320 also may be associated with aircraft 302 or a combination of both frame structure 316 and aircraft 302.

In these depicted examples, computer system 376 may control cargo handling system 304 using information generated by sensor system 320. Computer system 376 may be associated with frame structure 316 for cargo handling system 304 in this illustrative example. In some examples, computer system 376 may be associated with aircraft 302 or a combination of aircraft 302 and frame structure 316.

The illustration of cargo handling environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in some advantageous embodiments, cargo 306 may be a single object or multiple objects. For example, without limitation, cargo handling system 304 may hold cargo 306 in the form of two containers, two tank racks, a vehicle and a tank rack, or some other combination of objects to form cargo 306. In some advantageous embodiments, cargo handling system 304 may include a number of frame structures and engagement systems in addition to frame structure 316 and engagement system 318 to lift additional cargo. In still other advantageous embodiments, engagement systems may only have pins or forklifts rather than the other types of engagement devices illustrated for engagement system 318 in FIG. 3.

Figure 4:
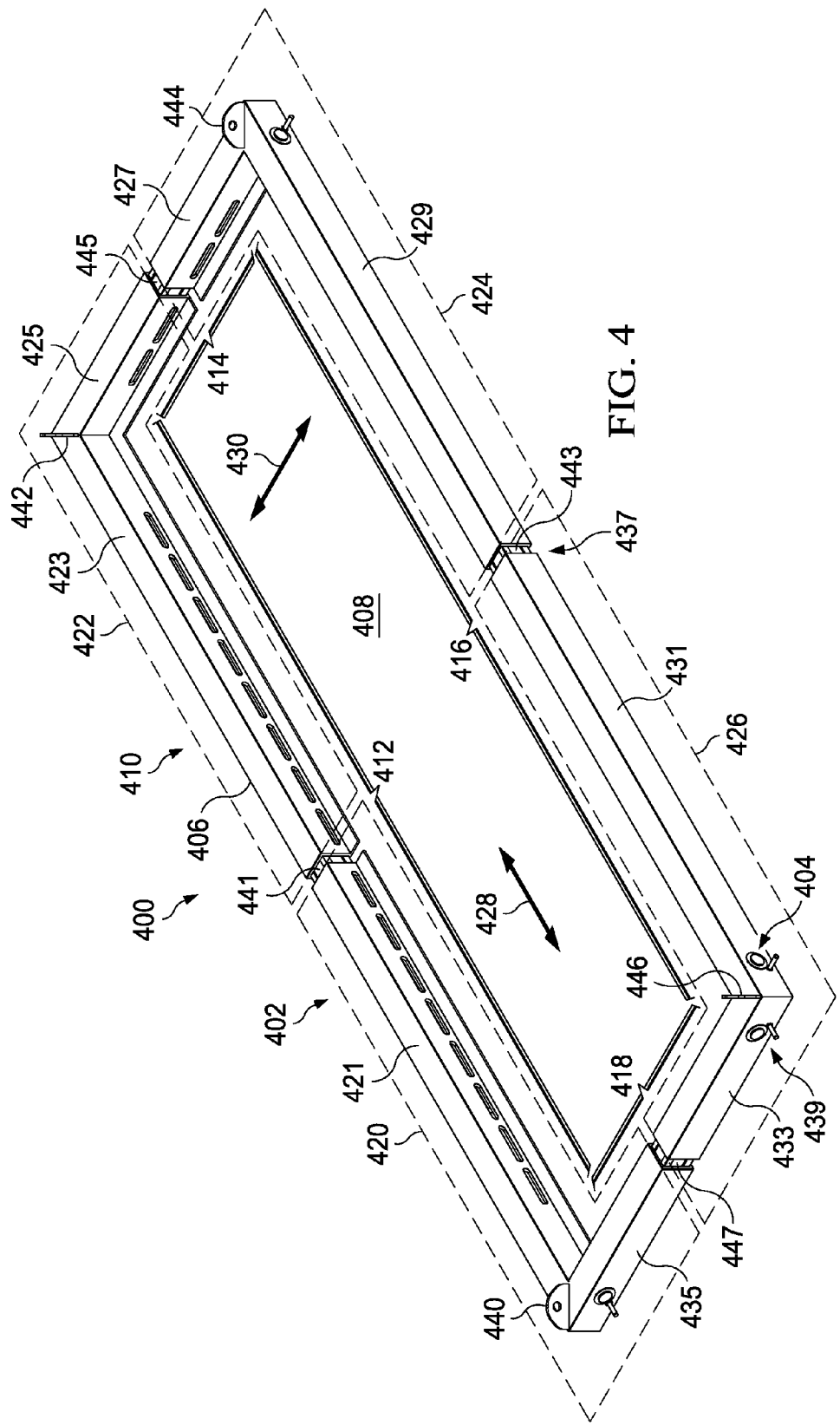
FIG. 4 is an illustration of a cargo handling system in accordance with an advantageous embodiment.

With reference now to FIG. 4, an illustration of a cargo handling system is depicted in accordance with an advantageous embodiment. In this illustrative example, cargo handling system 400 is an example of one implementation for cargo handling system 304 in FIG. 3. As depicted, cargo handling system 400 may include frame structure 402 and engagement system 404.

Frame structure 402 may comprise frame 406 having interior area 408. Interior area 408 may be configured to encompass cargo, such as cargo 306 in FIG. 3. Frame 406 may have quadrilateral shape 410 in this illustrative example.

Quadrilateral shape 410 may be comprised of segment 412, segment 414, segment 416, and segment 418. Segment 412 and segment 416 may be substantially parallel to each other and have substantially the same length. Segment 414 and segment 418 may be substantially parallel to each other and have substantially the same length.

In this illustrative example, the lengths of segment 412 and segment 416 may change and/or the lengths of segment 414 and segment 418 may change to adjust the dimensions for frame structure 402. For example, without limitation, frame 406 may have portions 420, 422, 424, and 426. These portions may form the corners for frame 406. Part 421 of portion 420 and part 423 of portion 422 may form segment 412. Part 425 of portion 422 and part 427 of portion 424 may form segment 414. Part 429 of portion 424 and part 431 of portion 426 may form segment 416. Part 433 of portion 426 and part 435 of portion 420 may form segment 418.

In the depicted example, the lengths of segment 412 and segment 416 may be changed by moving each of portions 420, 422, 424, and 426 in a direction along axis 428. The lengths of segment 414 and segment 418 may be changed by moving each of portions 420, 422, 424, and 426 in a direction along axis 430.

For example, without limitation, the lengths of segment 412 and segment 416 may be changed by moving portion 420 and portion 426 in a first direction along axis 428, moving portion 422 and portion 424 in a second direction along axis 428, or a combination of the two. Further, the lengths of segment 414 and segment 418 may be changed by moving portion 420 and portion 422 in a first direction along axis 430, moving portion 424 and portion 426 in a second direction along axis 430, or a combination of the two.

Additionally, member 441 may extend inside part 421 of portion 420 and part 423 of portion 422. Portion 420 and portion 422 may slide along member 441 when moved in a direction along axis 428. Further, member 443 may extend inside part 429 of portion 424 and part 431 of portion 426. Portion 424 and portion 426 may slide along member 443 when moved in a direction along axis 428.

Still further, member 445 may extend inside of part 425 of portion 422 and part 427 of portion 424. Portion 422 and portion 424 may slide along member 445 when moved in a direction along axis 430. Member 447 may extend inside part 433 of portion 426 and part 435 of portion 420 of frame 406. Portion 426 and portion 420 may slide along member 447 when moved in a direction along axis 430. Members 441, 443, 445, and 447 may be part of support frame 437 for frame structure 402 in this example.

In this illustrative example, engagement system 404 may include pin system 439. Pin system 439 may be configured to engage cargo with holes. In this manner, the cargo may be held in place by pin system 439.

In this depicted example, frame structure 402 may also include lifting points 440, 442, 444, and 446 on frame 406. Cables, such as cables 358 in FIG. 3, may be attached to lifting points 440, 442, 444, and 446 on frame 406.

Figure 5:
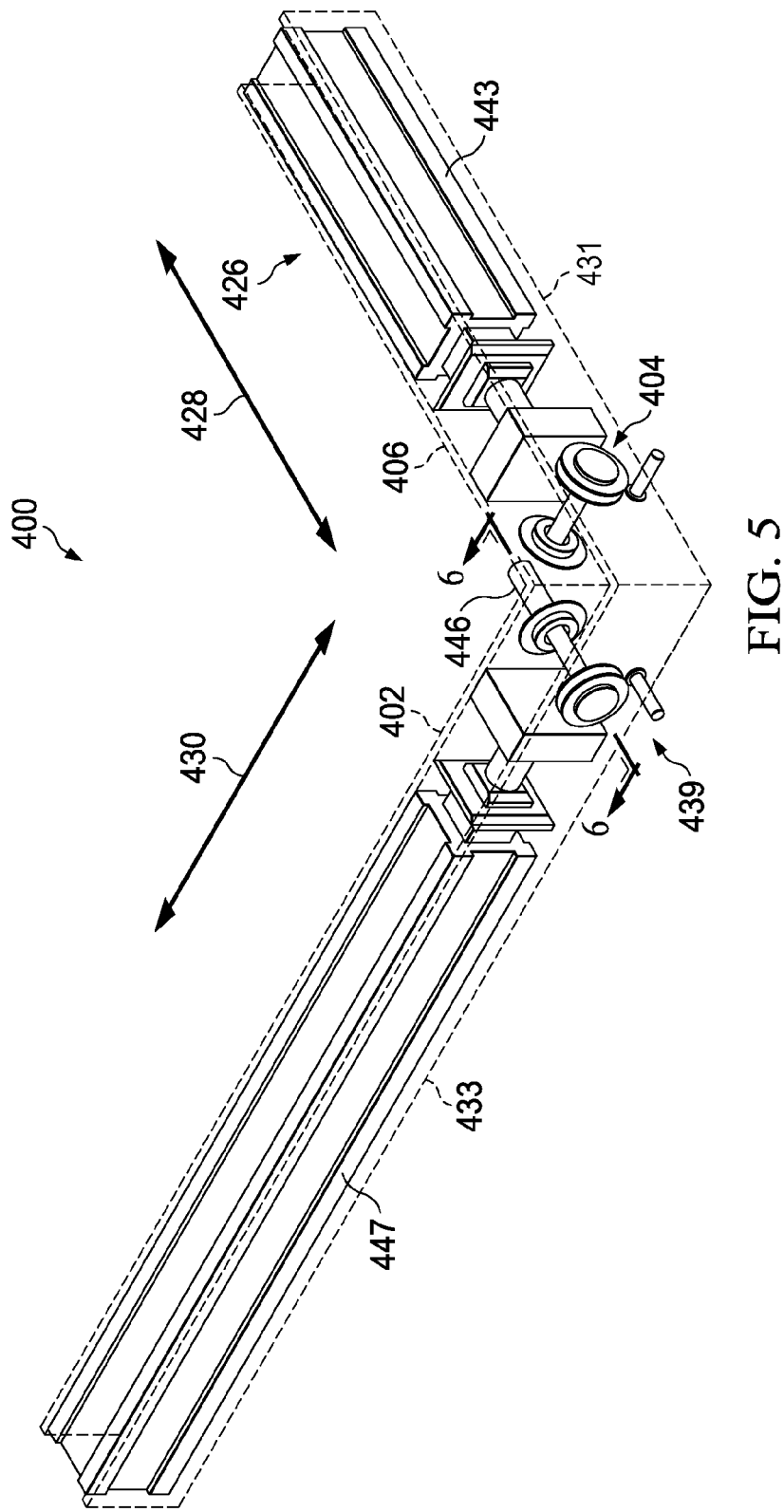
FIG. 5 is an illustration of a phantom view of a portion of a frame for a frame structure in accordance with an advantageous embodiment.

With reference now to FIG. 5, an illustration of a phantom view of a portion of a frame for a frame structure is depicted in accordance with an advantageous embodiment. In this illustrative example, portion 426 of frame 406 for cargo handling system 400 may be seen in phantom view.

In this illustrative example, member 443 may extend inside part 431 of portion 426. Portion 426 may slide in a direction along axis 428 along member 443. Further, member 447 may extend inside part 433 of portion 426. Portion 426 may slide in a direction along axis 430 along member 447.

Figure 6:
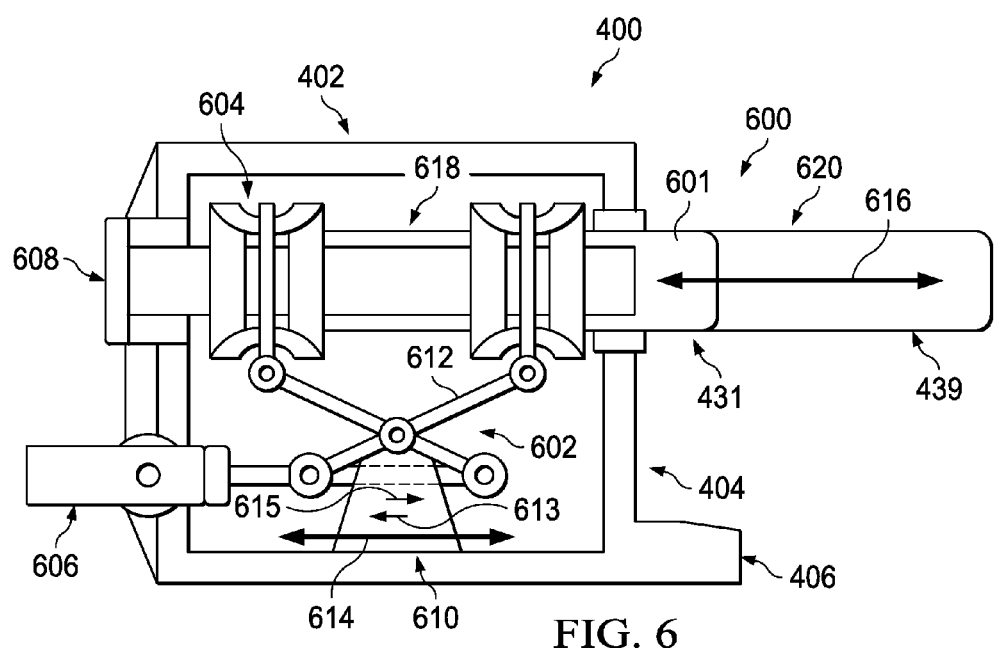
FIG. 6 is an illustration of a cross-sectional view of a portion of a cargo handling system in accordance with an advantageous embodiment.

With reference now to FIG. 6, an illustration of a cross-sectional view of a portion of a cargo handling system is depicted in accordance with an advantageous embodiment. In this illustrative example, a cross-section of cargo handling system 400 in FIG. 4 is depicted taken along lines 6-6 in FIG. 5.

In this illustrative example, pin system 439 for cargo handling system 400 may include pin unit 600 and movement unit 602. Movement unit 602 is associated with pin unit 600. Pin unit 600 may include pin 601. Movement unit 602 may include slider assembly 604, hydraulic cylinder 606, and support pin 608. Slider assembly 604 may include support structure 610 and slider 612.

In this depicted example, hydraulic cylinder 606 may be configured to move slider 612 in the direction of arrow 614. This movement of slider 612 may move pin 601 in the direction of arrow 616. For example, without limitation, movement of slider 612 in the direction of arrow 614 may cause pin 601 to move between retracted position 618 and engaged position 620.

More specifically, hydraulic cylinder 606 may move in the direction of arrow 613. Movement of hydraulic cylinder 606 in the direction of arrow 613 may cause pin 601 to move from retracted position 618 to engaged position 620. Movement of hydraulic cylinder 606 in the direction of arrow 615 may cause pin 601 to move from engaged position 620 to retracted position 618.

Additionally, support pin 608 may provide support for pin 601 when pin 601 is moved between retracted position 618 and engaged position 620.

Figure 7:
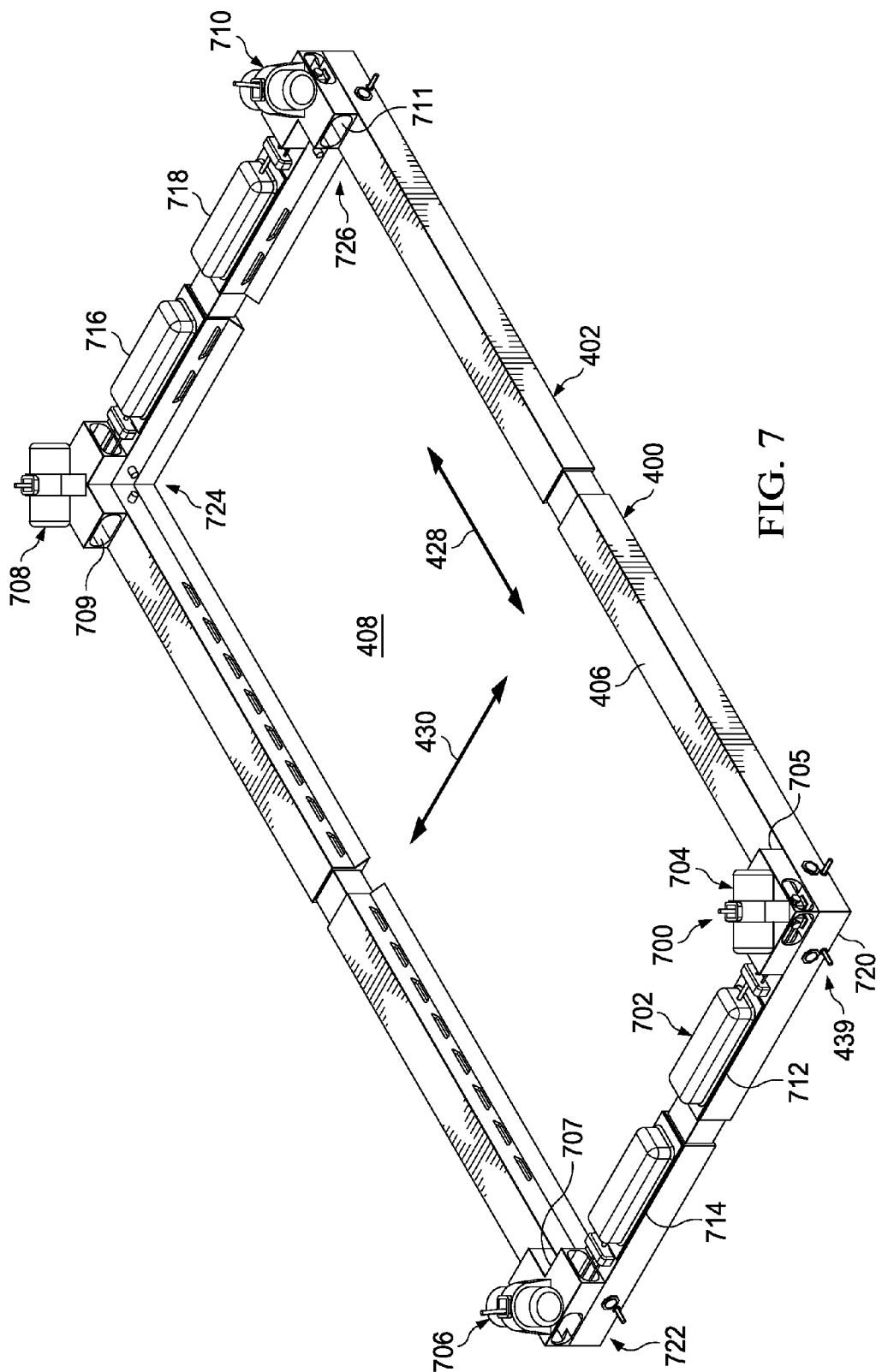
FIG. 7 is an illustration of a cargo handling system with a hoist system and thruster system in accordance with an advantageous embodiment.

With reference now to FIG. 7, an illustration of a cargo handling system with a hoist system and thruster system is depicted in accordance with an advantageous embodiment. In this illustrative example, cargo handling system 400 in FIG. 4 may have hoist system 700 and thruster system 702 connected to frame 406 for frame structure 402.

As depicted, hoist system 700 may include hoist units 704, 706, 708, and 710. Hoist units 704, 706, 708, and 710 may be connected to frame 406 by support structures 705, 707, 709, and 711. Thruster system 702 may include thruster units 712, 714, 716, and 718. Thruster units 712, 714, 716, and 718 may be connected to frame 406 directly.

In this illustrative example, hoist unit 704 and thruster unit 712 may be associated with corner 720 of frame structure 402. Hoist unit 706 and thruster unit 714 may be associated with corner 722 of frame structure 402. Hoist unit 708 and thruster unit 716 may be associated with corner 724 of frame structure 402. Hoist unit 710 and thruster unit 718 may be associated with corner 726 of frame structure 402.

Hoist system 700 may be used to adjust the height of corners 720, 722, 724, and 726 of frame structure 402 relative to each other. For example, without limitation, cargo handling system 400 may carry cargo comprising containers having different weights. These different weights may result in frame structure 402 not being substantially horizontal when the cargo is transported. Hoist system 700 may be used to level frame structure 402 to be substantially horizontal.

Additionally, thruster system 702 may be used to move each of corners 720, 722, 724, and 726 of frame structure 402 in directions relative to axis 428 and/or axis 430. For example, without limitation, thruster system 702 may be used to stabilize each of corners 720, 722, 724, and 726 in response to undesired movement of frame structure 402. This undesired movement may be caused by movement of the aircraft associated with cargo handling system 400, wind, and/or other suitable factors.

Figure 8:
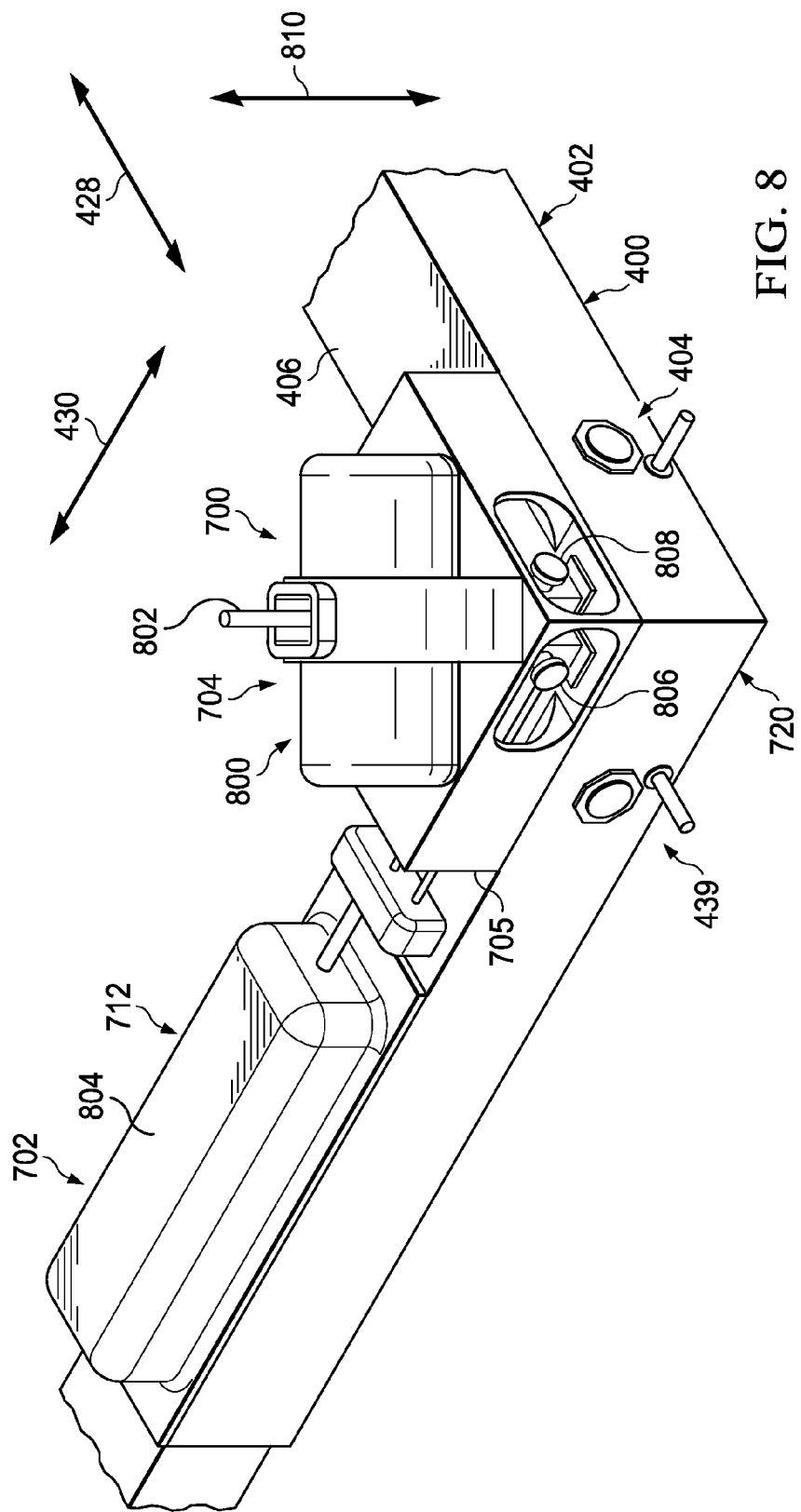
FIG. 8 is an illustration of a hoist unit and thruster unit connected to a corner of a frame structure in accordance with an advantageous embodiment.

With reference now to FIG. 8, an illustration of a hoist unit and thruster unit connected to a corner of a frame structure is depicted in accordance with an advantageous embodiment. In this illustrative example, hoist unit 704 may be depicted attached to support structure 705 at corner 720 of frame 406 for frame structure 402.

Hoist unit 704 may comprise hoist 800 and hoist cable 802. Hoist unit 704 may be used to adjust corner 720 of frame 406 in the direction of axis 810. In other words, hoist unit 704 may be used to adjust the height of corner 720 with respect to corners 722, 724, and 726 in FIG. 7 and with respect to the aircraft associated with cargo handling system 400.

In this illustrative example, thruster unit 712 may be attached to frame 406 and connected to support structure 705 at corner 720 of frame 406. Thruster unit 712 may comprise air cylinder 804, thruster 806, and thruster 808. Compressed air may be sent from air cylinder 804 through thruster 806 and thruster 808 to generate a force to move corner 720 of frame 406. For example, without limitation, thruster 806 may cause movement of corner 720 in a direction along axis 428. Thruster 808 may cause movement of corner 720 in a direction along axis 430.

Figure 9:
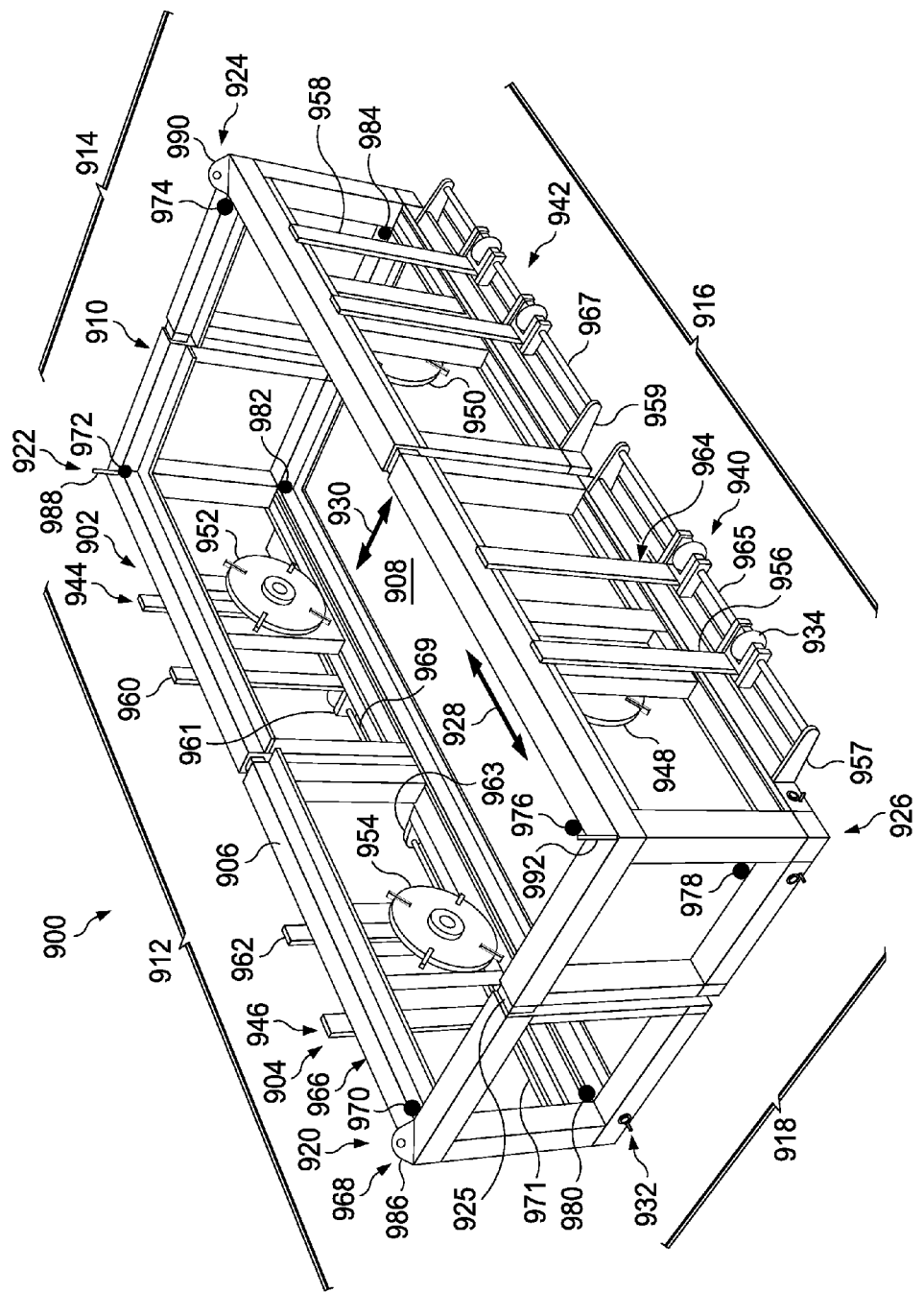
FIG. 9 is an illustration of a cargo handling system in accordance with an advantageous embodiment.

With reference now to FIG. 9, an illustration of a cargo handling system is depicted in accordance with an advantageous embodiment. In this illustrative example, cargo handling system 900 may be an example of one implementation for cargo handling system 304 in FIG. 3.

As depicted, cargo handling system 900 may include frame structure 902 and engagement system 904. Frame structure 902 may include frame 906. Frame 906 may have interior area 908 with quadrilateral shape 910. Quadrilateral shape 910 may be formed by segments 912, 914, 916, and 918. The lengths of segments 912, 914, 916, and 918 may change to allow frame 906 to encompass cargo, such as cargo 306 in FIG. 3, within interior area 908.

Frame 906 may have portions 920, 922, 924, and 926 that form the corners for frame 906. In this illustrative example, each of portions 920, 922, 924, and 926 of frame 906 may slide along support frame 925 in the directions along axis 928 and axis 930 to change the lengths of segments 912, 914, 916, and 918.

For example, without limitation, the lengths of segment 912 and segment 916 may be changed by moving portion 920 and portion 926 in a first direction along axis 928, moving portion 922 and portion 924 in a second direction along axis 930, or a combination of the two. Further, the lengths of segment 914 and segment 918 may be changed by moving portion 920 and portion 922 in a first direction along axis 930, moving portion 924 and portion 926 in a second direction along axis 930, or a combination of the two. In this manner, the dimensions of frame structure 902 may be changed by changing the lengths of the segments forming frame 906.

In this depicted example, engagement system 904 may include pin system 932 and forklift system 934. Forklift system 934 may include forklift units 940, 942, 944, and 946 associated with frame 906. Further, forklift units 940, 942, 944, and 946 may have engagement units 948, 950, 952, and 954, respectively. Engagement units 948, 950, 952, and 954 may be configured to engage wheels (not shown) for cargo in the form of a vehicle.

Additionally, forklift units 940, 942, 944, and 946 may also have sets of tines 956, 958, 960, and 962, respectively. Sets of tines 956, 958, 960, and 962 may be configured to support cargo within interior area 908 of frame structure 902. Sets of tines 956, 958, 960, and 962 may be connected to assemblies 957, 959, 961, and 963, respectively, by adjustment screws 965, 967, 969, and 971, respectively. Assemblies 957, 959, 961, and 963 may be connected to frame 906. In this illustrative example, each set of tines may be in stored position 964 on each assembly.

In this illustrative example, cargo handling system 900 may also have sensor system 966 associated with frame structure 902. Sensor system 966 may take the form of camera system 968 in this depicted example. Camera system 968 may include cameras 970, 972, 974, 976, 978, 980, 982, and 984. Camera system 968 may generate information to aide in positioning cargo handling system 900 over cargo. For example, without limitation, camera system 968 may generate images and/or video used to detect cargo such that cargo handling system 900 may be positioned over the cargo.

Additionally, cargo handling system 900 may have lifting points 986, 988, 990, and 992. Cables, such as cables 358 in FIG. 3, may be attached to these lifting points to connect cargo handling system 900 to an aircraft.

Figure 10:
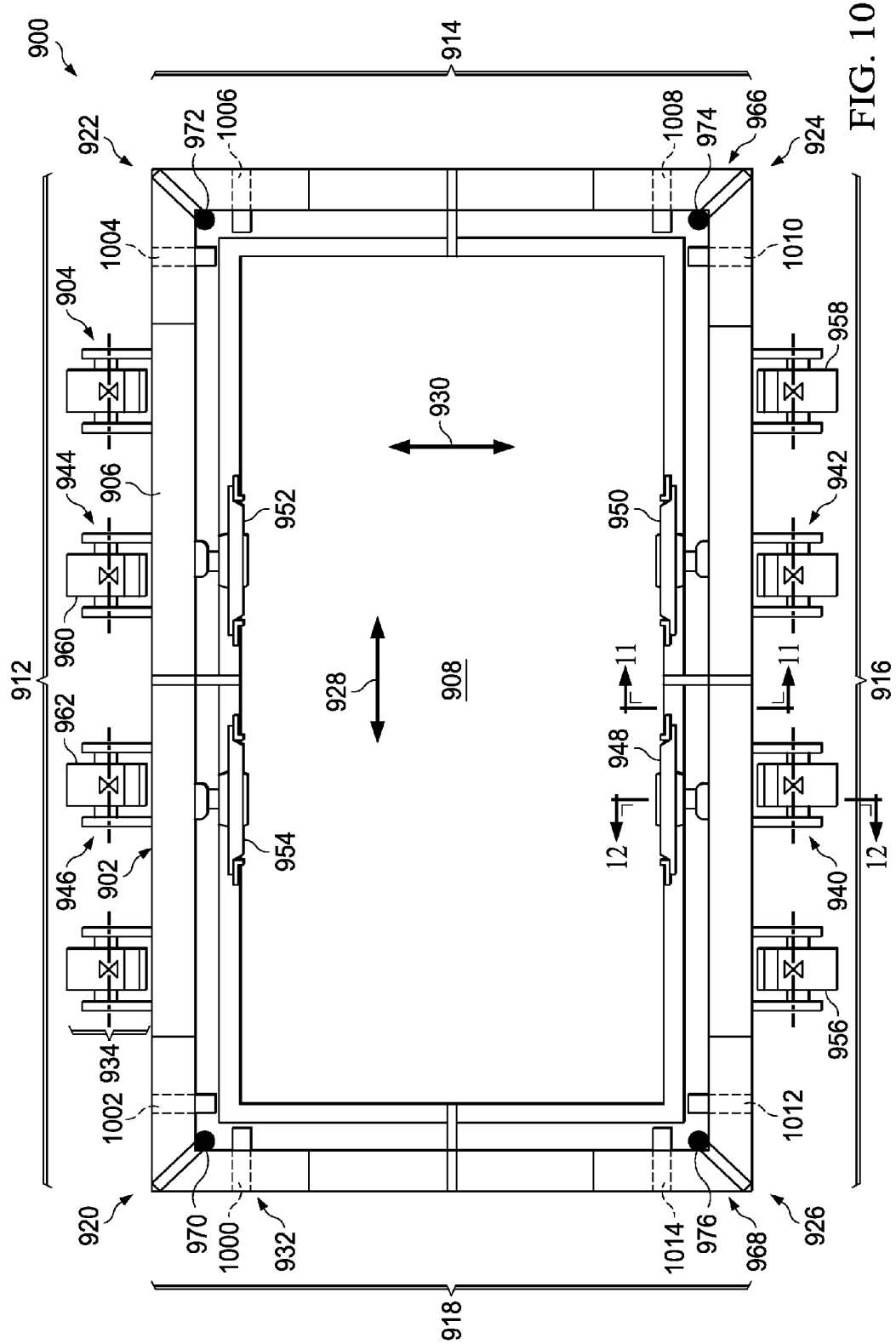
FIG. 10 is an illustration of a top view of a cargo handling system in accordance with an advantageous embodiment.

With reference now to FIG. 10, an illustration of a top view of a cargo handling system is depicted in accordance with an advantageous embodiment. In this illustrative example, a top view of cargo handling system 900 in FIG. 9 may be presented.

As depicted, pin system 932 may include pin units 1000, 1002, 1004, 1006, 1008, 1010, 1012, and 1014. Pin units 1000, 1006, 1008, and 1014 may be configured to move in a direction along axis 928. Pin units 1002, 1004, 1010, and 1012 may be configured to move in a direction along axis 930.

In this illustrative example, each of forklift units 940, 942, 944, and 946 may move in a direction along axis 928. For example, without limitation, forklift unit 940 may move relative to portion 926 of frame 906 in a direction along axis 928. Similarly, forklift unit 942 may move relative to portion 924 of frame 906 in a direction along axis 928. Forklift unit 944 may move relative to portion 922 of frame 906 in a direction along axis 928. Forklift unit 946 may move relative to portion 920 of frame 906 in a direction along axis 928.

Additionally, each of engagement units 948, 950, 952, and 954 may be moved in a direction along axis 928. For example, without limitation, engagement unit 948 may be moved along portion 926 of frame 906 in a direction along axis 928. Similarly, engagement unit 950 may be moved along portion 924 of frame 906 in a direction along axis 928. Engagement unit 952 may be moved along portion 922 of frame 906 in a direction along axis 928. Engagement unit 954 may be moved along portion 920 of frame 906 in a direction along axis 928.

In this depicted example, engagement units 948, 950, 952, and 954 may move independently from forklift units 940, 942, 944, and 946, respectively. In some illustrative examples, an engagement unit may be moved to align with a forklift unit.

Figure 11:
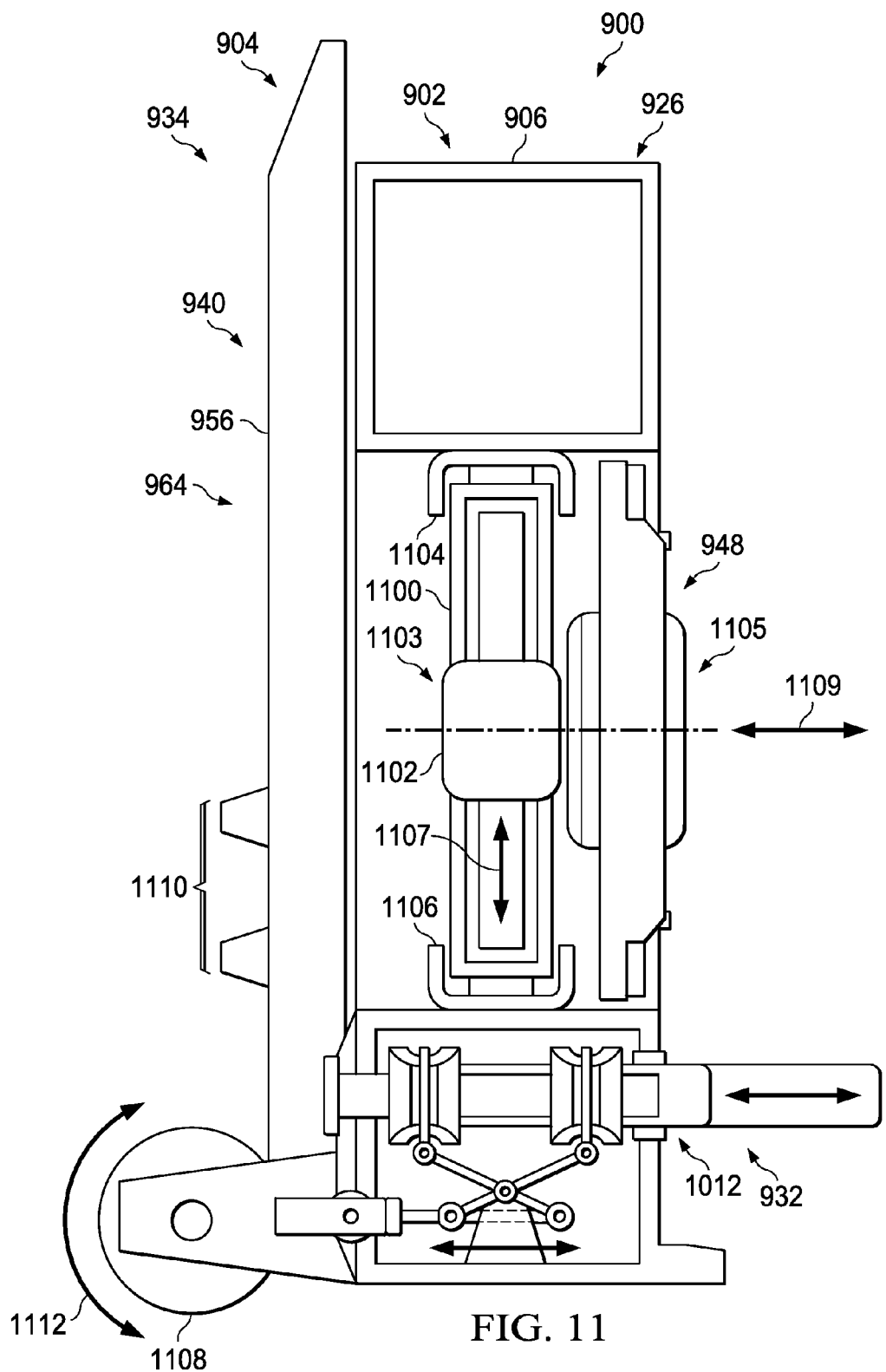
FIG. 11 is an illustration of a cross-sectional view of a portion of a cargo handling system in accordance with an advantageous embodiment.

With reference now to FIG. 11, an illustration of a cross-sectional view of a portion of a cargo handling system is depicted in accordance with an advantageous embodiment. In this illustrative example, a cross-sectional view of portion 926 of frame 906 for frame structure 902 of cargo handling system 900 in FIG. 9 is depicted taken along lines 11-11 in FIG. 10.

In this illustrative example, pin unit 1012 in pin system 932 may be located within portion 926 of frame 906. Pin unit 1012 may have a configuration similar to the configuration for pin unit 600 in FIG. 6.

Further, engagement unit 948 may be associated with carriage assembly 1100. Carriage assembly 1100 may include hub and wheel restraint 1102 in position 1103. Engagement unit 948 may be connected to hub and wheel restraint 1102 of carriage assembly 1100. Hub and wheel restraint 1102 may move in a direction along axis 1107 in this example. In this manner, engagement unit 948 may move in a direction along axis 1107. Further, engagement unit 948 may move in a direction along axis 1109. Engagement unit 948 may be in retracted position 1105 in this depicted example.

Additionally, frame 906 may be associated with upper track 1104 and lower track 1106. Carriage assembly 1100 may move within upper track 1104 and lower track 1106 to move engagement unit 948 along frame 906 in a direction along axis 928 in FIG. 10.

As depicted, set of tines 956 for forklift unit 940 may be in stored position 964 in this illustrative example. Further, set of tines 956 may be associated with rotational motor 1108. Rotational motor 1108 may be connected to frame 906 in this illustrative example. Rotational motor 1108 may be configured to rotate set of tines 956 in the direction of arrow 1112. Additionally, set of tines 956 may have locking members 1110 on set of tines 956.

Figure 12:
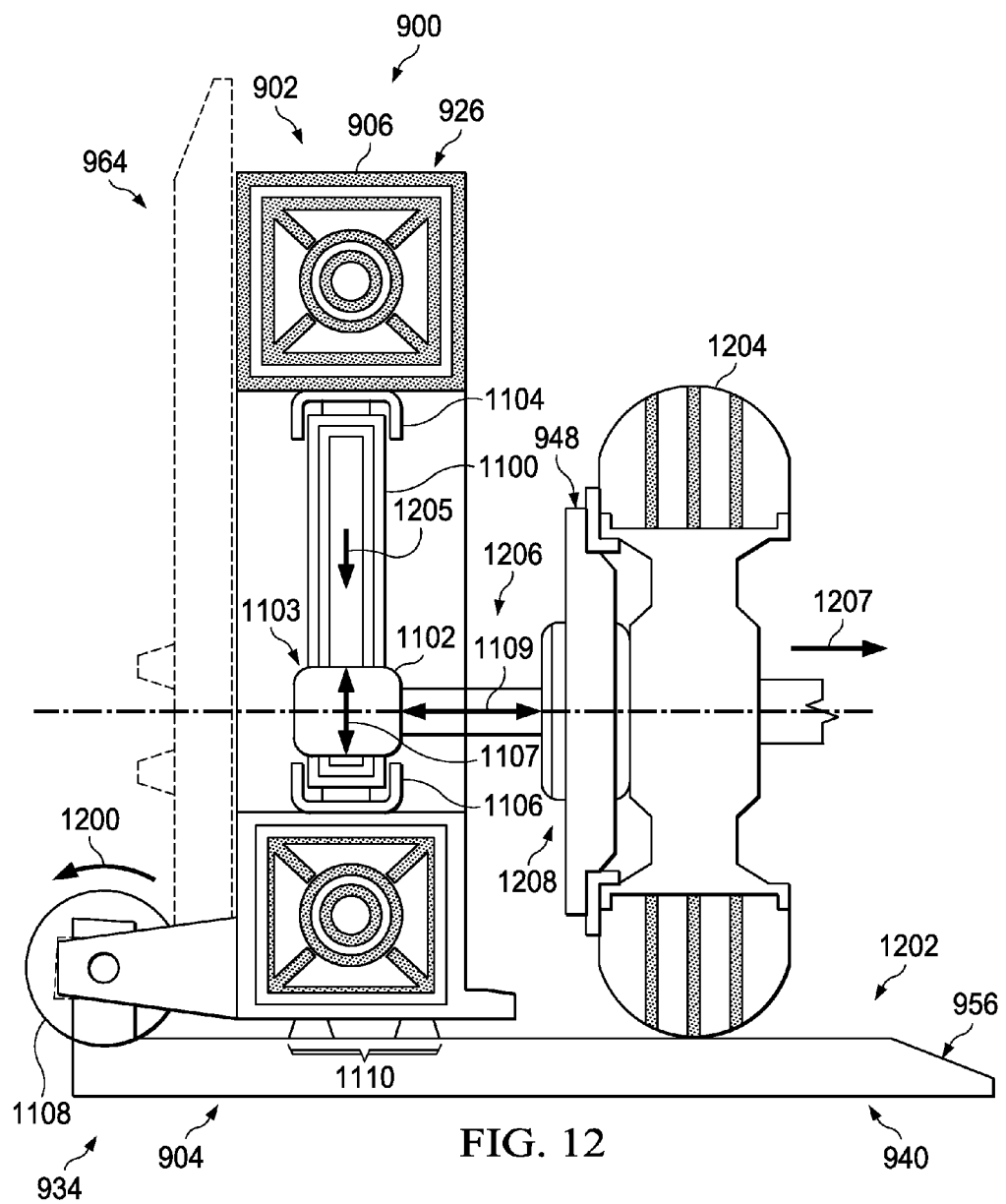
FIG. 12 is an illustration of a cross-sectional view of a portion of a cargo handling system in accordance with an advantageous embodiment.

With reference now to FIG. 12, an illustration of a cross-sectional view of a portion of a cargo handling system is depicted in accordance with an advantageous embodiment. In this illustrative example, a cross-sectional view of portion 926 of cargo handling system 900 may be depicted taken along lines 12-12 in FIG. 10.

As depicted, rotational motor 1108 may rotate set of tines 956 for forklift unit 940 in FIG. 9 in the direction of arrow 1200 from stored position 964 to active position 1202. In active position 1202, set of tines 956 for forklift unit 940 may support wheel 1204. Wheel 1204 may be a wheel for a vehicle, such as vehicle 314 in FIG. 3. Additionally, locking members 1110 for set of tines 956 may lock forklift unit 940 into frame 906 in active position 1202.

In this illustrative example, hub and wheel restraint 1102 may move in the direction of arrow 1205 from position 1103 in FIG. 11 to position 1206. This movement may position engagement unit 948 along axis 1107 such that engagement unit 948 may engage wheel 1204. As depicted, engagement unit 948 may move in the direction of arrow 1207 from retracted position 1105 in FIG. 11 to engaged position 1208 to engage wheel 1204.

Figure 13:
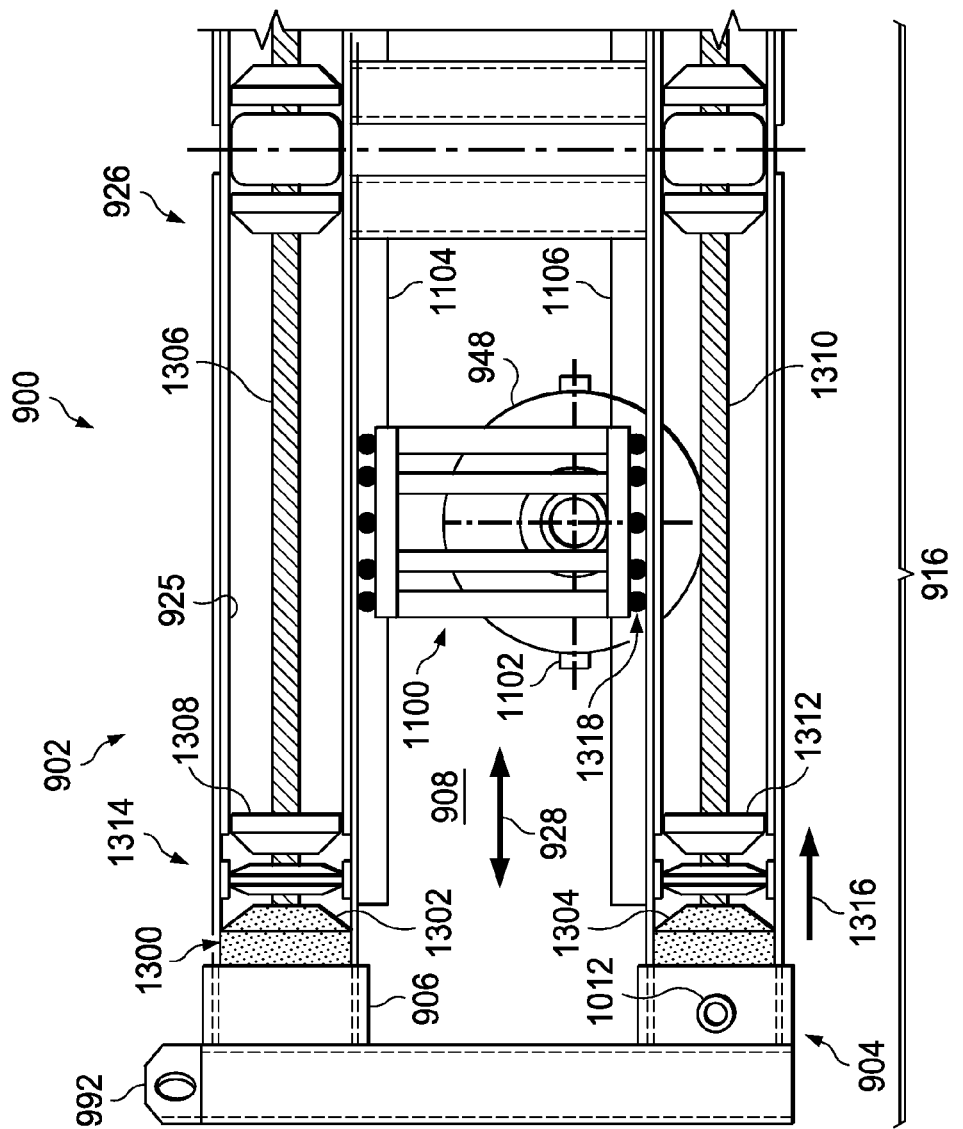
FIG. 13 is an illustration of a partially-exposed view of a portion of a cargo handling system in accordance with an advantageous embodiment.

With reference now to FIG. 13, an illustration of a partially-exposed view of a portion of a cargo handling system is depicted in accordance with an advantageous embodiment. In this illustrative example, a partially-exposed view of portion 926 of frame 906 for frame structure 902 of cargo handling system 900 in FIG. 9 may be depicted. Additionally, forklift unit 940 may not be shown in this example to provide a clearer view of carriage assembly 1100 and engagement unit 948.

In this illustrative example, portion 926 of frame 906 may be configured to slide along support frame 925 in a direction along axis 928. This sliding may be performed using motor system 1300 for cargo handling system 900. Motor system 1300 may be located inside of frame 906. Motor system 1300 may comprise motor 1302 and motor 1304 in this example.

Further, motor system 1300 may be associated with adjusting screw 1306, support adjusting screw 1308, adjusting screw 1310, and support adjusting screw 1312. Adjusting screw 1306 and adjusting screw 1310 may be associated with portion 926 of frame 906. Support adjusting screw 1308 and support adjusting screw 1312 may be associated with support frame 925 extending within portion 926 of frame 906.

Motor system 1300 may rotate these adjusting screws relative to each other to move portion 926 of frame 906. For example, without limitation, motor 1302 may rotate adjusting screw 1306 relative to support adjusting screw 1308, and motor 1304 may rotate adjusting screw 1310 relative to support adjusting screw 1312.

In this illustrative example, portion 926 may be in retracted position 1314. In other words, portion 926 may not be moved to decrease the length of segment 916 for frame 906. However, portion 926 of frame 906 may be moved in the direction of arrow 1316 to increase the length of segment 916 for frame 906.

Additionally, carriage assembly 1100 for cargo handling system 900 may move along upper track 1104 and lower track 1106, in this example, using roller system 1318.

With reference now to FIG. 14, an illustration of a partially-exposed view of a portion of a cargo handling system is depicted in accordance with an advantageous embodiment. In this illustrative example, a partially-exposed view of portion 926 of frame 906 for frame structure 902 of cargo handling system 900 in FIG. 9 may be depicted. In this depicted example, carriage assembly 1100 and engagement unit 948 may not be shown in cargo handling system 900 in FIG. 14.

Forklift unit 940 may be associated with movement system 1400 in this example. Movement system 1400 may include movement unit 1402 and movement unit 1404. Movement unit 1402 may be associated with tine 1406 in set of tines 956. Movement unit 1404 may be associated with tine 1408 in set of tines 956. Movement unit 1402 and movement unit 1404 may be configured to move set of tines 956 in a direction along axis 928 along portion 926 of frame 906. As depicted, movement unit 1402 and movement unit 1404 may be configured to move along adjustment screw 965.

With reference now to FIG. 15, an illustration of a cross-sectional view of a movement system for a forklift unit is depicted in accordance with an advantageous embodiment. In this illustrative example, a cross-sectional view of movement unit 1402 in FIG. 14 may be depicted taken along lines 15-15 in FIG. 14. Further, movement unit 1402 may be configured to move along adjustment screw 965. As depicted, forklift unit 940 may be in active position 1202 in this illustrative example.

Figure 16:
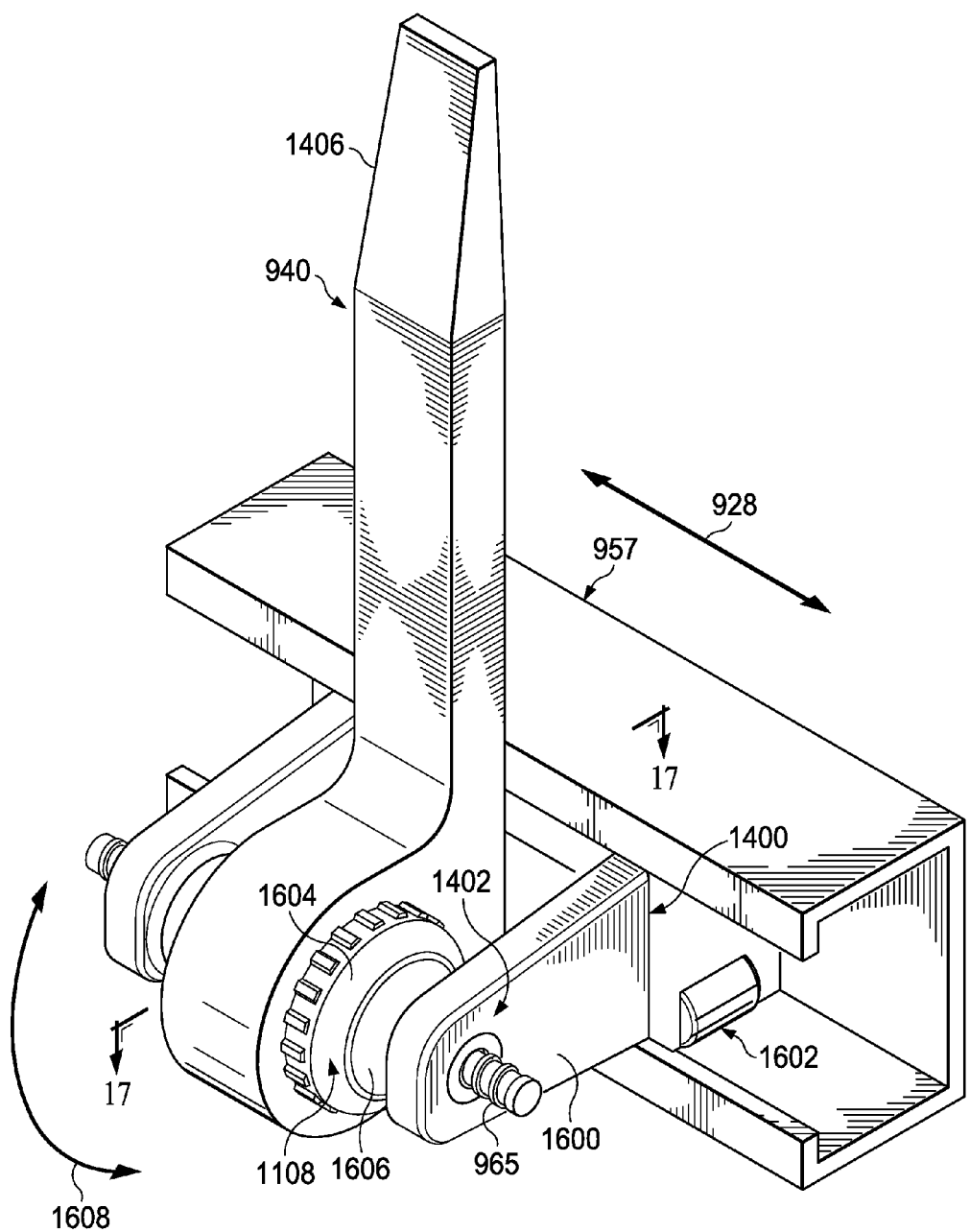
FIG. 16 is an illustration of a forklift unit connected to a portion of an assembly in accordance with an advantageous embodiment.

With reference now to FIG. 16, an illustration of a forklift unit connected to a portion of an assembly is depicted in accordance with an advantageous embodiment. In this illustrative example, forklift unit 940 may be seen connected to a portion of assembly 957, which may be connected to frame 906 in FIG. 9.

As depicted in this example, tine 1406 of forklift unit 940 may be connected to assembly 957 through sliding support 1600. Further, sliding support 1600 may be connected to tine 1406 by adjustment screw 965. Sliding support 1600 may move in a direction along axis 928 along assembly 957 using rollers 1602.

Additionally, in this illustrative example, rotational motor 1108 may be comprised of first motor 1604 and second motor 1606. First motor 1604 may allow tine 1406 of forklift unit 940 to rotate between stored position 964 and active position 1202 in FIG. 12 in the direction of arrow 1608. Second motor 1606 may allow tine 1406 of forklift unit 940 to move along adjustment screw 965 in a direction along axis 928 to move sliding support 1600 along assembly 957.

Figure 17:
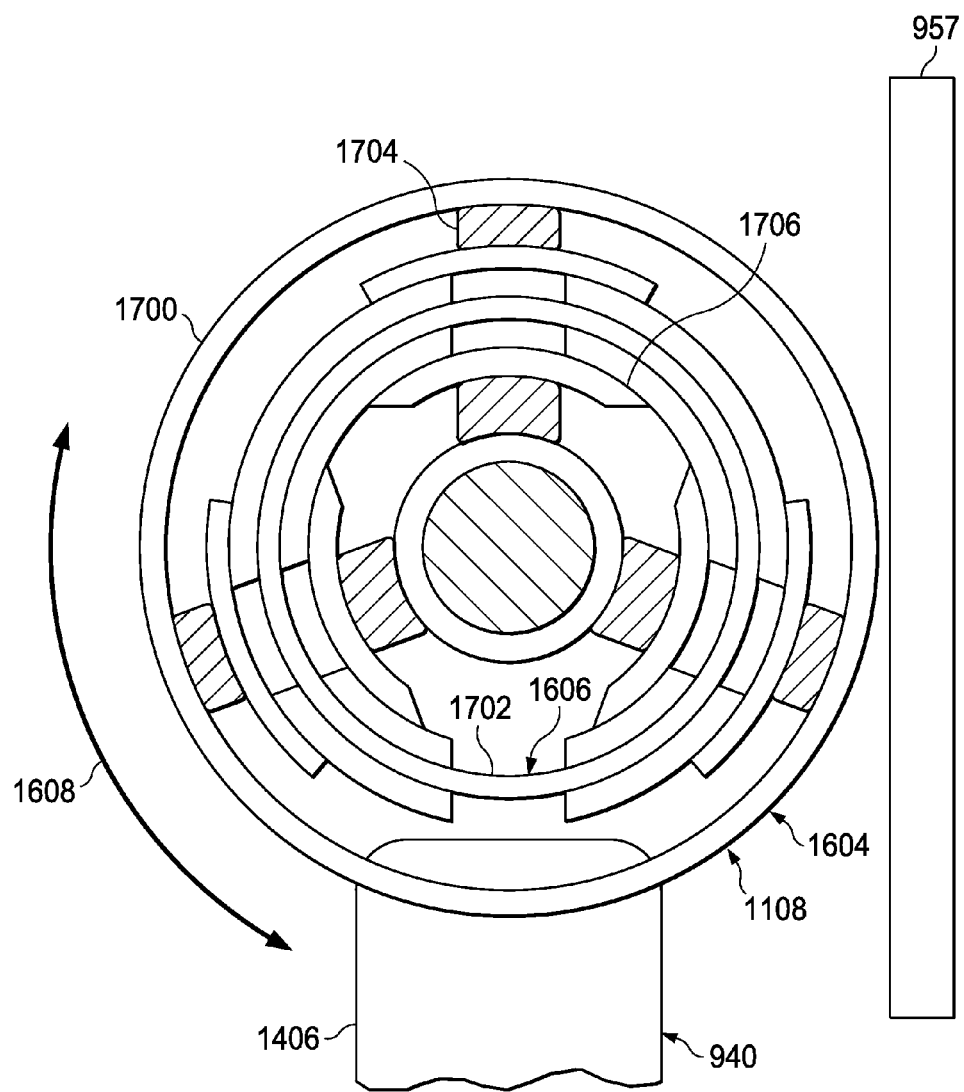
FIG. 17 is an illustration of a cross-section of a rotational motor for a movement system for a forklift unit in accordance with an advantageous embodiment.

With reference now to FIG. 17, an illustration of a cross-section of a rotational motor for a movement system for a forklift unit is depicted in accordance with an advantageous embodiment. In this illustrative example, a cross-sectional view of rotational motor 908 may be seen taken along lines 17-17 in FIG. 16.

As depicted in this example, first motor 1604 of rotational motor 1108 may have first housing 1700. First housing 1700 may be attached to structure 1704 of tine 1406. In this manner, rotation of first housing 1700 for first motor 1604 may cause rotation of tine 1406 in the direction of arrow 1608. First motor 1604 may be associated with second motor 1606. However, rotation of first motor 1604 may not cause rotation of second motor 1606. In other words, first motor 1604 and second motor 1606 may rotate independently of each other.

Further, second motor 1606 of rotational motor 1108 may have second housing 1702. Second housing 1702 may be attached to adjustment screw 965 and structure 1706 for sliding support 1600 in FIG. 16. Rotation of second housing 1702 may cause movement of sliding support 1600 in FIG. 16 and tine 1406 in a direction along axis 928 in FIG. 15.

Figure 18:
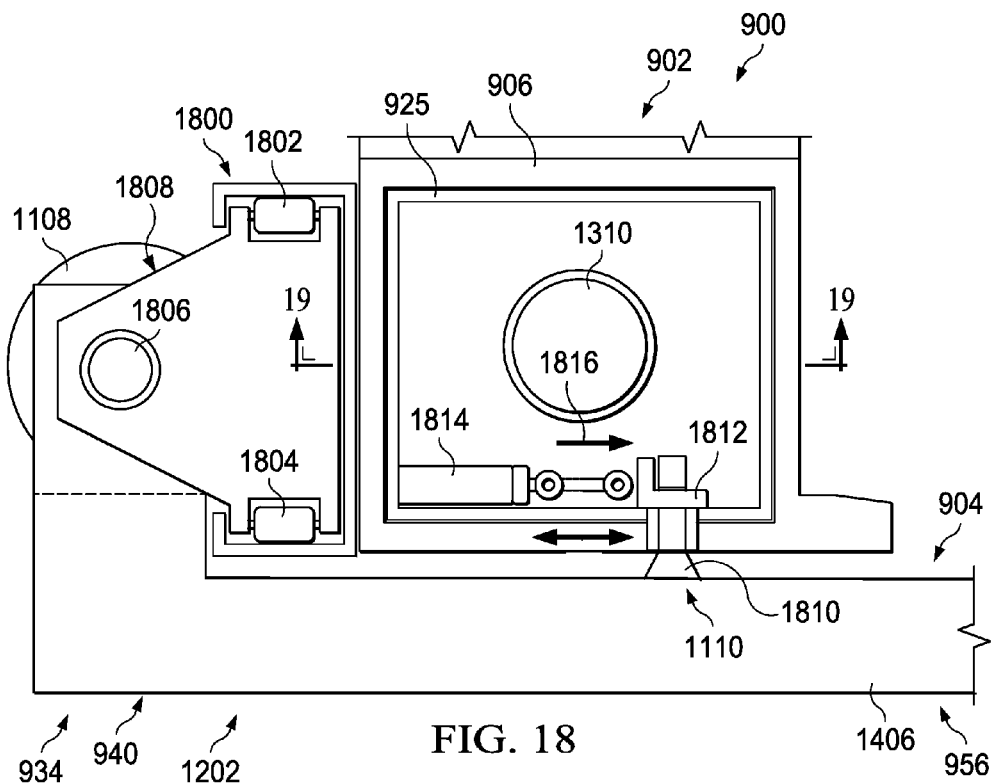
FIG. 18 is an illustration of a cross-sectional view of a forklift unit connected to a frame for a frame structure in accordance with an advantageous embodiment.

With reference now to FIG. 18, an illustration of a cross-sectional view of a forklift unit connected to a frame for a frame structure is depicted in accordance with an advantageous embodiment. In this illustrative example, a cross-sectional view of cargo handling system 900 may be depicted taken along lines 18-18 in FIG. 15. Forklift unit 940 may be connected to frame 906 through rail assembly 1800.

Rail assembly 1800 may include support roller 1802, support roller 1804, adjustment screw 1806, and sliding support 1808. Rotational motor 1108 may rotate set of tines 956 around adjustment screw 1806.

When forklift unit 940 is in active position 1202, set of tines 956 may be locked into place using locking members 1110. In this illustrative example, locking member 1810 for tine 1406 may be locked in slide lock 1812. When forklift unit 940 is rotated into active position 1202, hydraulic cylinder 1814 may move in the direction of arrow 1816 to move slide lock 1812. Slide lock 1812 may be moved to engage locking member 1810 for tine 1406 in this example.

In this manner, tine 1406 for forklift unit 940 may be locked into active position 1202 by slide lock 1812.

Figure 19:
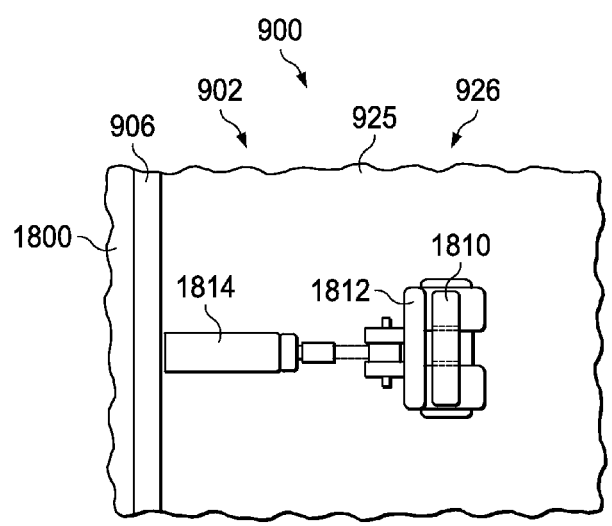
FIG. 19 is an illustration of a cross-sectional view inside a frame in a frame structure in accordance with an advantageous embodiment.

With reference now to FIG. 19, an illustration of a cross-sectional view inside a frame in a frame structure is depicted in accordance with an advantageous embodiment. In this illustrative example, a cross-sectional view of portion 926 of frame 906 may be depicted taken along lines 19-19 in FIG. 18. As depicted, slide lock 1812 may hold locking member 1810 for tine 1406 in a locked position.

Figure 20:
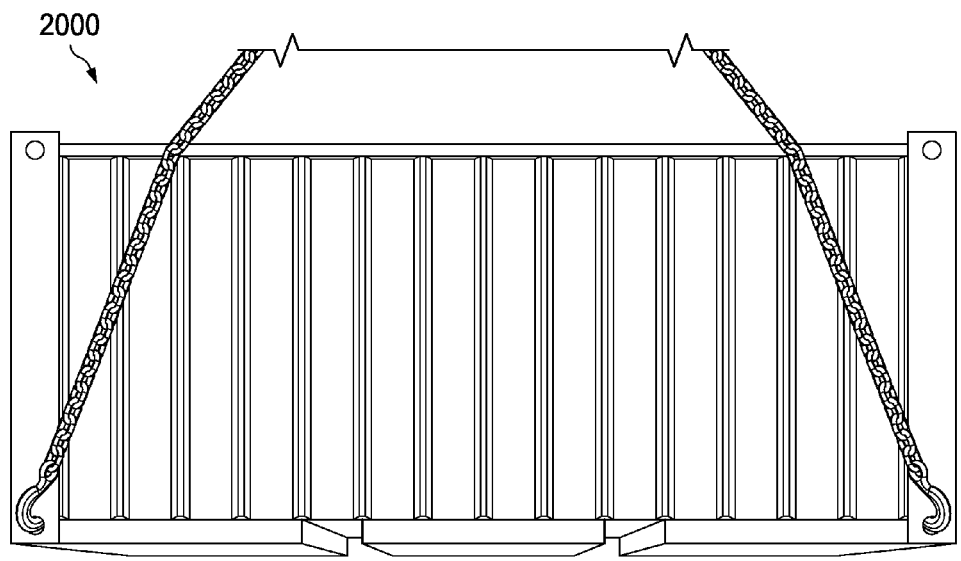
FIG. 20 is an illustration of a container in accordance with an advantageous embodiment.

With reference now to FIG. 20, an illustration of a container is depicted in accordance with an advantageous embodiment. In this illustrative example, container 2000 may be an example of cargo 306 in FIG. 3. In particular, container 2000 may be an example of one implementation for container 308 in FIG. 3.

Figure 21:
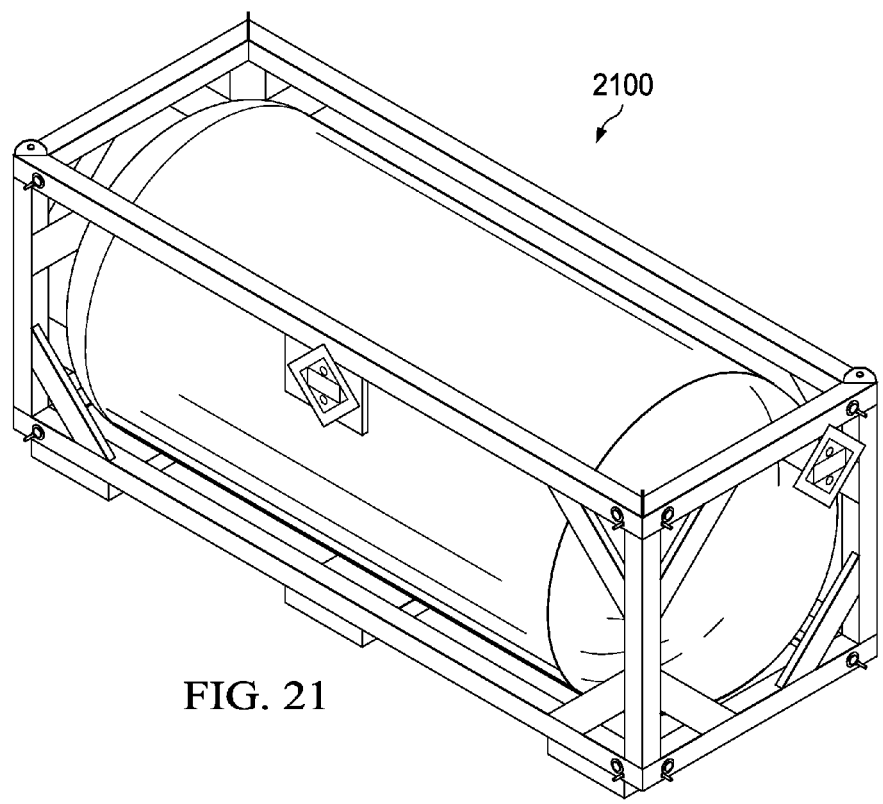
FIG. 21 is an illustration of a tank rack in accordance with an advantageous embodiment.

With reference now to FIG. 21, an illustration of a tank rack is depicted in accordance with an advantageous embodiment. In this illustrative example, tank rack 2100 may be one example of cargo 306 in FIG. 3. In particular, tank rack 2100 may be an example of one implementation for tank rack 310 in FIG. 3.

Figure 22:
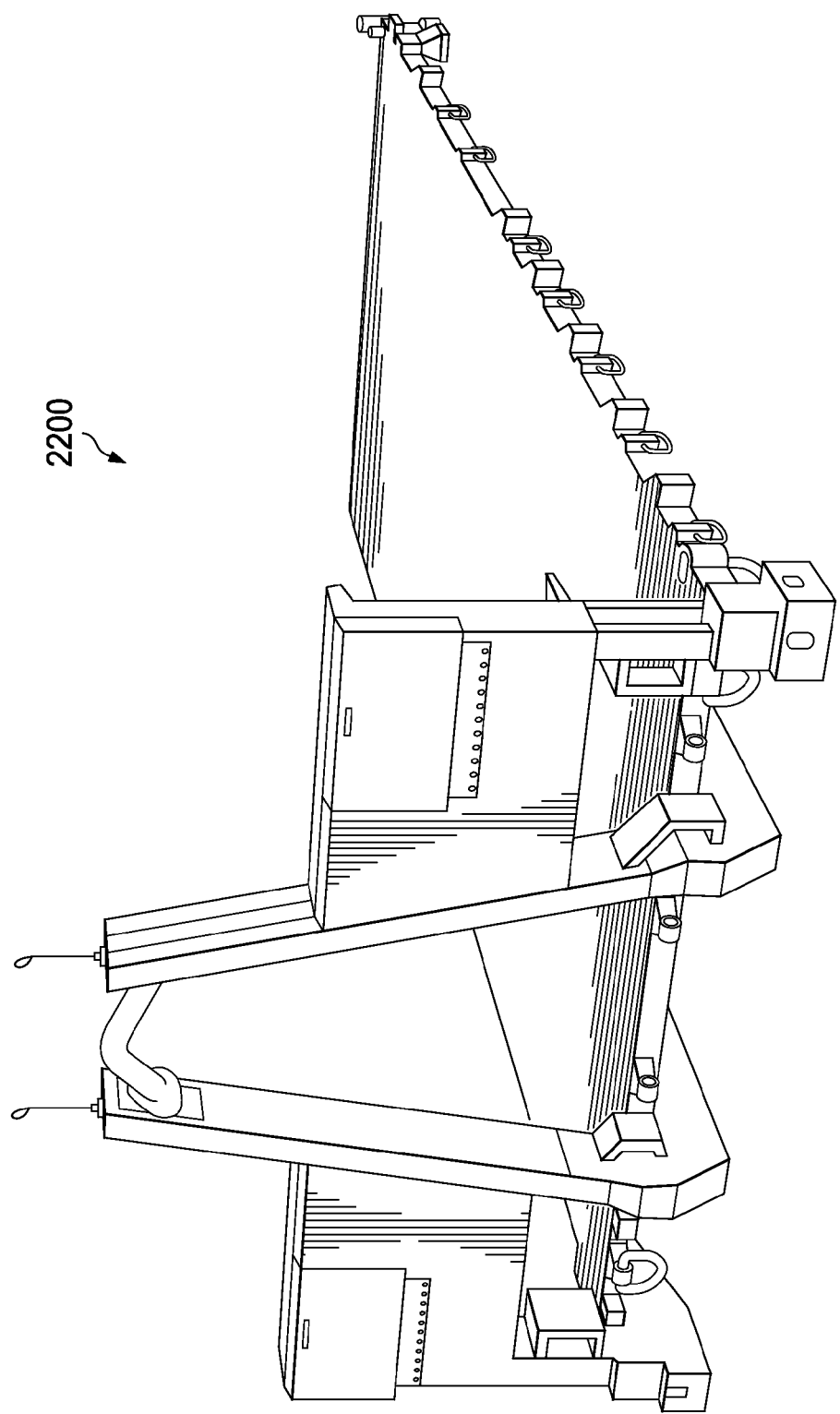
FIG. 22 is an illustration of a platform in accordance with an advantageous embodiment.

With reference now to FIG. 22, an illustration of a platform is depicted in accordance with an advantageous embodiment. In this illustrative example, platform 2200 may be another example of cargo 306 in FIG. 3. In particular, platform 2200 may be an example of one implementation for platform 312 in FIG. 3.

Figure 23:
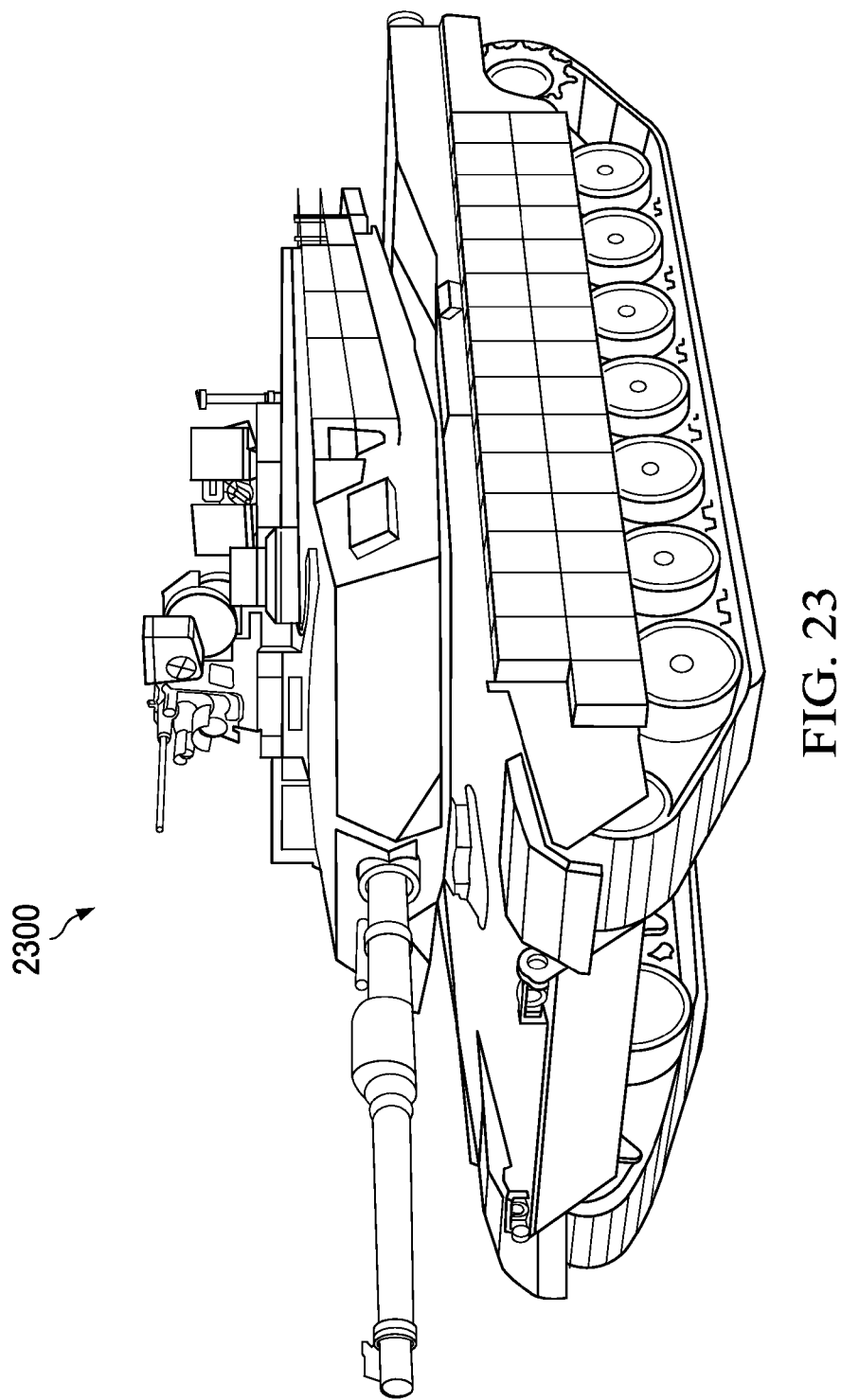
FIG. 23 is an illustration of a tank in accordance with an advantageous embodiment.

With reference now to FIG. 23, an illustration of a tank is depicted in accordance with an advantageous embodiment. In this illustrative example, tank 2300 may be yet another example of cargo 306 in FIG. 3. In particular, tank 2300 may be an example of one implementation for vehicle 314 in FIG. 3.

Figure 24:
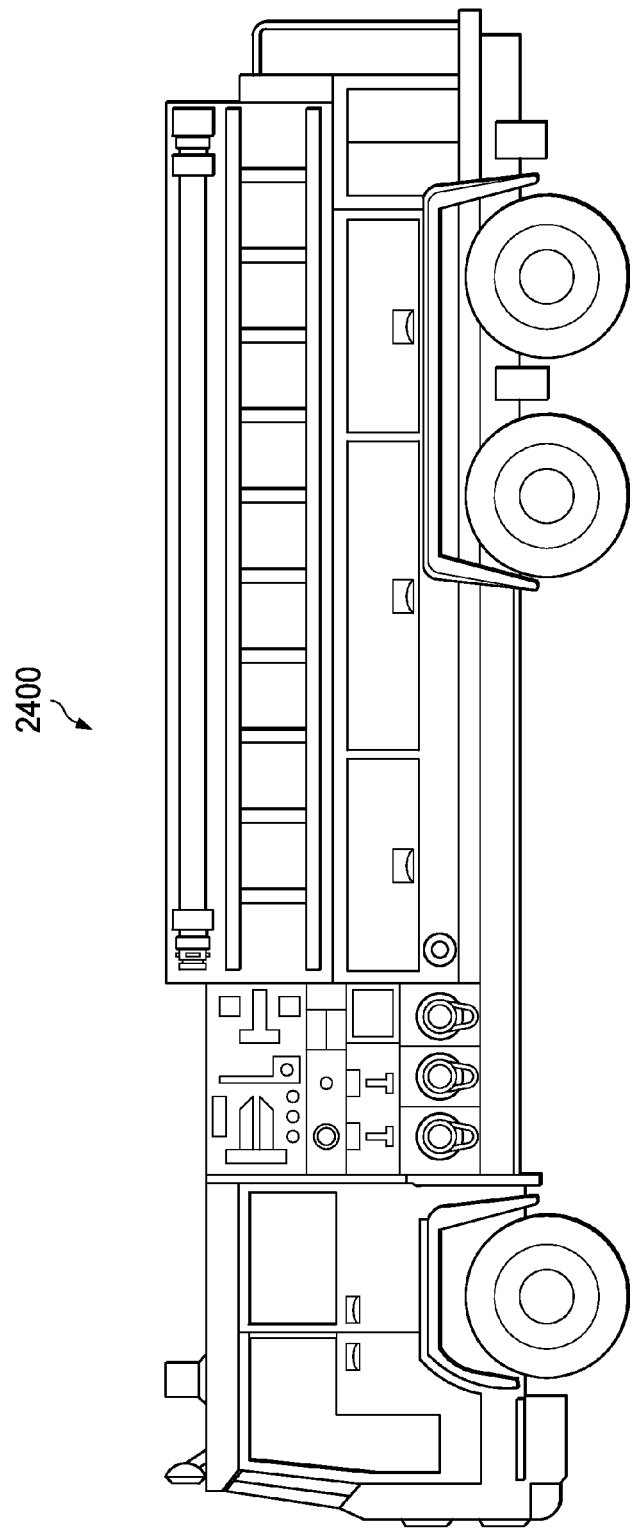
FIG. 24 is an illustration of a fire truck in accordance with an advantageous embodiment.

With reference now to FIG. 24, an illustration of a fire truck is depicted in accordance with an advantageous embodiment. In this illustrative example, fire truck 2400 may be an example of cargo 306 in FIG. 3. In particular, fire truck 2400 may be an example of one implementation for vehicle 314 in FIG. 3.

Figure 25:
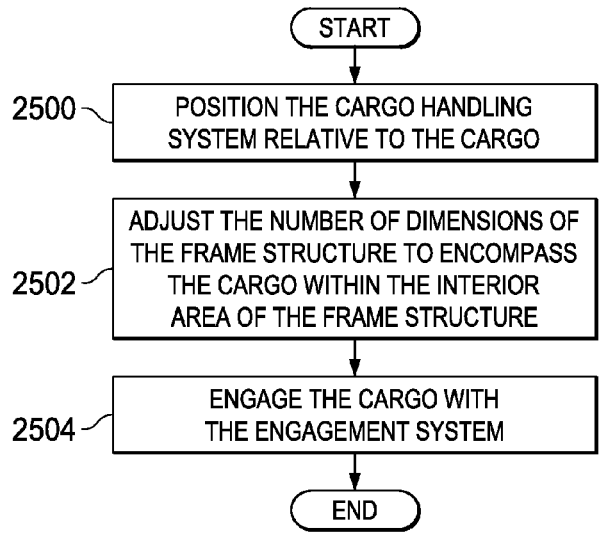
FIG. 25 is an illustration of a flowchart of a process for handling cargo in accordance with an advantageous embodiment.

With reference now to FIG. 25, an illustration of a flowchart of a process for handling cargo is depicted in accordance with an advantageous embodiment. The process illustrated in FIG. 25 may be implemented in cargo handling environment 300 in FIG. 3. In particular, this process may be implemented using cargo handling system 304 in FIG. 3.

The process may begin by positioning cargo handling system 304 relative to cargo 306 (operation 2500). Cargo handling system 304 may comprise frame structure 316 and engagement system 318. Frame structure 316 may be configured to change in number of dimensions 324 to encompass cargo 306 within interior area 326 of frame structure 316. Engagement system 318 may be configured to engage cargo 306 and hold cargo 306 within interior area 326 of frame structure 316 when frame structure 316 is at least one of moved away from a ground, moved towards a ground, in a position on the ground, and in a position over the ground.

Thereafter, the process may adjust number of dimensions 324 of frame structure 316 to encompass cargo 306 within interior area 326 of frame structure 316 (operation 2502). The adjustment of number of dimensions 324 may be made automatically to frame structure 316 to encompass cargo 306. For example, computer system 376 may use sensor system 320 to adjust number of dimensions 324 of frame structure 316 to encompass cargo 306 within interior area 326 of frame structure 316. These adjustments may be made without need for a human operator to control adjustments to number of dimensions 324. The process may then engage cargo 306 with engagement system 318 (operation 2504), with the process terminating thereafter.

Figure 26:
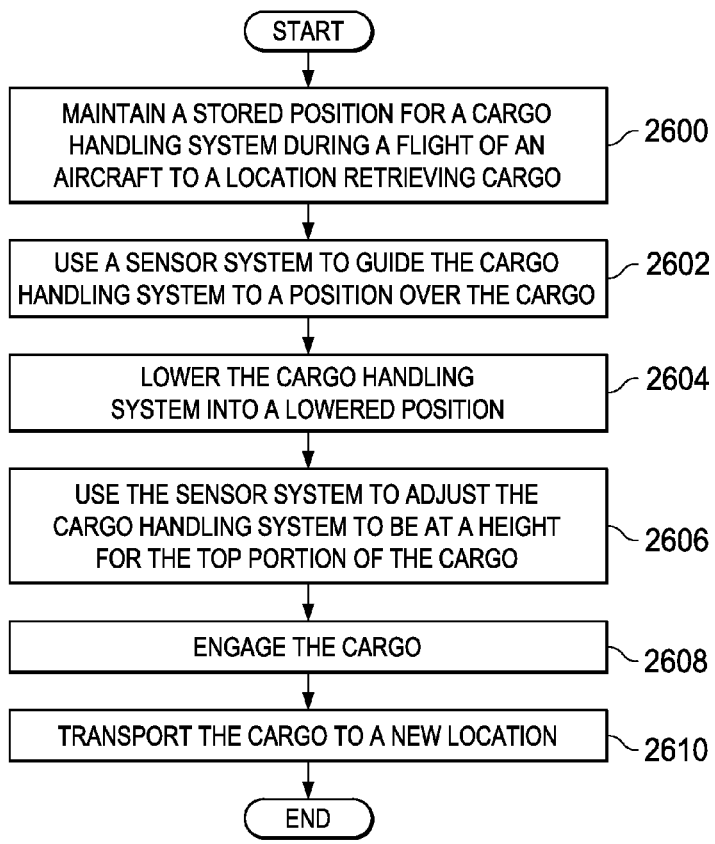
FIG. 26 is an illustration of a flowchart of a process for handling cargo in accordance with an advantageous embodiment.

With reference now to FIG. 26, an illustration of a flowchart of a process for handling cargo is depicted in accordance with an advantageous embodiment. The process illustrated in FIG. 26 may be implemented in cargo handling environment 300 in FIG. 3. In particular, this process may be implemented using cargo handling system 304 in FIG. 3.

The process may begin by maintaining stored position 362 for cargo handling system 304 during flight of aircraft 302 to a location for retrieving cargo 306 (operation 2600). Thereafter, sensor system 320 may be used to guide cargo handling system 304 to a position over cargo 306 (operation 2602). For example, without limitation, in operation 2602, information generated by sensor system 320 may be used by the pilot of aircraft 302 to position aircraft 302 such that cargo handling system 304 is directly over cargo 306.

Cargo handling system 304 may then be lowered towards cargo 306 into lowered position 364 (operation 2604). Sensor system 320 may then be used to adjust cargo handling system 304 to be at a height for the top portion of cargo 306 (operation 2606).

Thereafter, cargo handling system 304 may engage cargo 306 (operation 2608). Aircraft 302 may then transport cargo 306 to a new location (operation 2610), with the process terminating thereafter. In operation 2610, aircraft 302 in the form of helicopter 303 may lift up to transport cargo 306 and may not use cable system 356 to lift cargo 306. However, in some illustrative examples, hoist system 342 may be used in lifting cargo 306.

Figure 27:
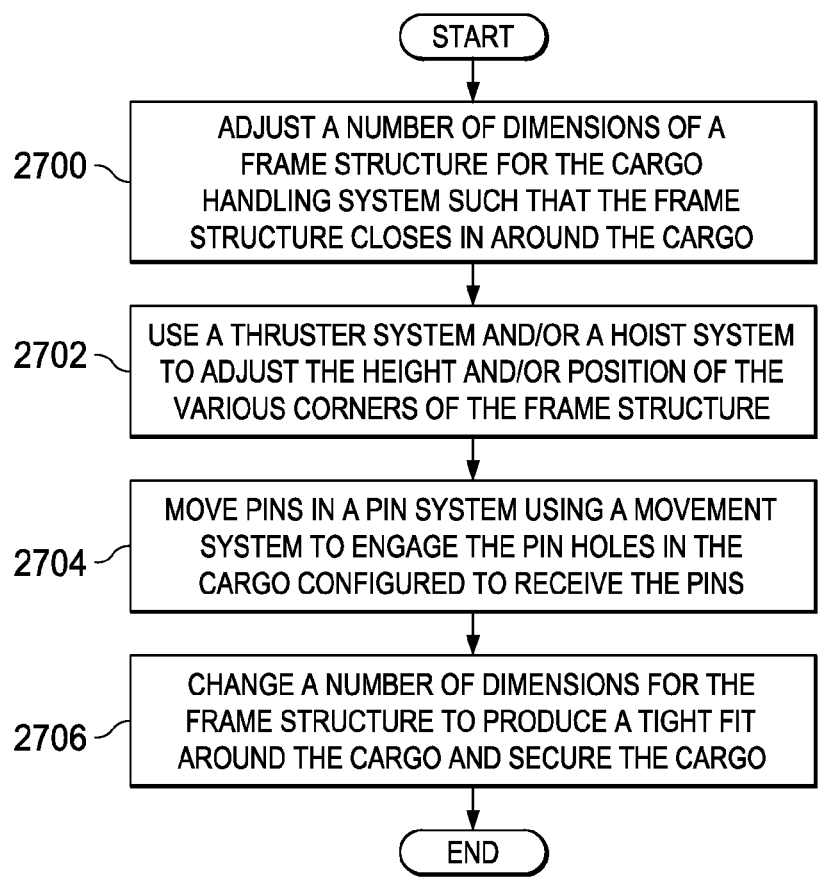
FIG. 27 is an illustration of a flowchart of a process for engaging cargo in accordance with an advantageous embodiment.

With reference now to FIG. 27, an illustration of a flowchart of a process for engaging cargo is depicted in accordance with an advantageous embodiment. The process illustrated in FIG. 27 may be implemented using engagement system 318 for cargo handling system 304 in FIG. 3. This process may be a more-detailed process for operation 2608 in FIG. 26.

In particular, this process may be implemented to engage cargo in the form of, for example, without limitation, containers, flat racks, and/or pallets. Additionally, this process may be implemented using pin system 338.

The process may begin by adjusting number of dimensions 324 of frame structure 316 such that frame structure 316 closes in around cargo 306 (operation 2700). Cargo handling system 304 may use thruster system 322 and/or hoist system 342 to adjust the height and/or position of the various corners of frame structure 316 (operation 2702).

For example, without limitation, in operation 2702, the various corners of frame structure 316 may be adjusted in height and/or position such that the positions of pins 346 in pin system 338 may match the pin holes in cargo 306 configured to receive pins 346. Further, the adjustments made in operation 2700 may be performed using sensor system 320.

Thereafter, pins 346 may move using movement system 348 to engage the pin holes in cargo 306 configured to receive pins 346 (operation 2704). Further, frame structure 316 may change in number of dimensions 324 to produce a tight fit around cargo 306 and secure cargo 306 (operation 2706), with the process terminating thereafter. In this illustrative example, operation 2706 may be performed as pins 346 are moved to engage the pin holes in cargo 306.

Figure 28:
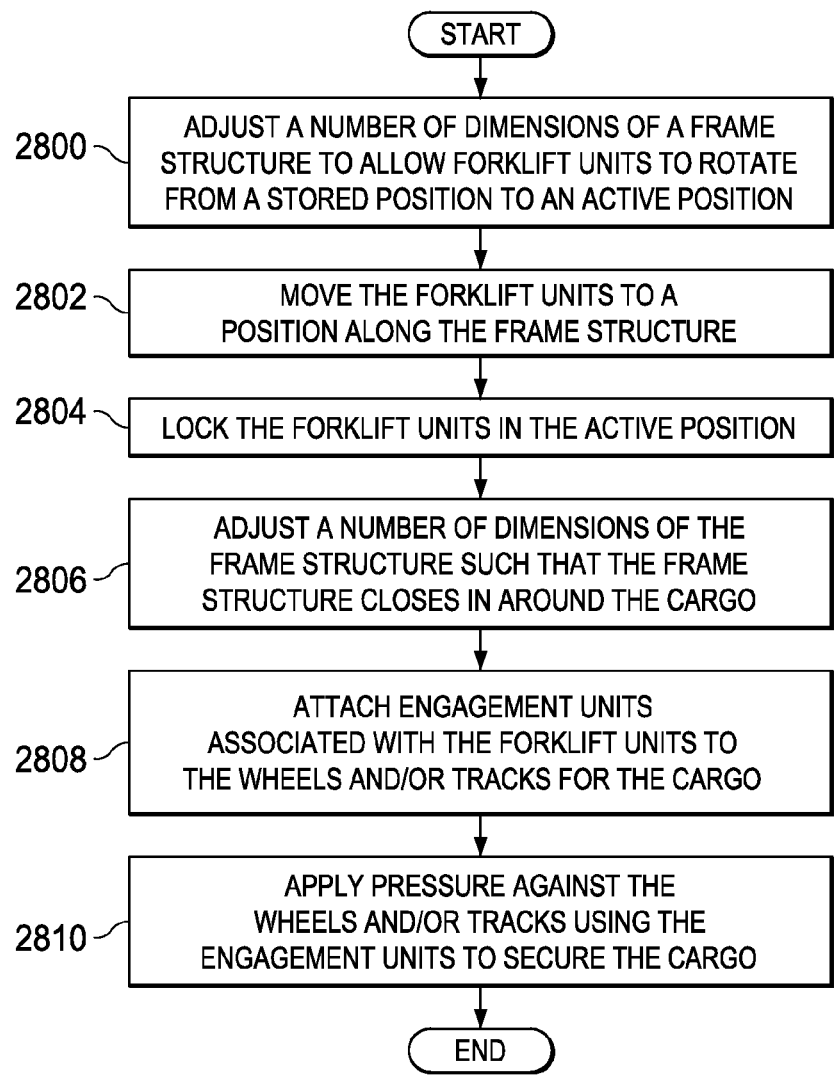
FIG. 28 is an illustration of a flowchart of a process for engaging cargo in accordance with an advantageous embodiment.

With reference now to FIG. 28, an illustration of a flowchart of a process for engaging cargo is depicted in accordance with an advantageous embodiment. The process illustrated in FIG. 28 may be implemented using engagement system 318 for cargo handling system 304 in FIG. 3. This process may be a more-detailed process for operation 2608 in FIG. 26.

In particular, this process may be implemented using forklift system 340. Additionally, this process may be implemented to engage cargo in the form of, for example, without limitation, wheeled vehicles and/or tracked vehicles.

The process may begin by adjusting number of dimensions 324 of frame structure 316 to allow forklift units 352 to rotate from stored position 362 to an active position (operation 2800). Operation 2800 may be performed using a rotational motor, such as rotational motor 1108 in FIG. 11. Each forklift unit may comprise a set of tines. Each tine in the set of tines may be moved independently of the other tines in the set of tines.

Thereafter, forklift units 352 may be moved to a position along frame structure 316 (operation 2802). In this illustrative example, forklift units 352 may be moved in a direction along frame 328 for frame structure 316. Forklift units 352 may then be locked in the active position (operation 2804).

Number of dimensions 324 of frame structure 316 may be adjusted such that frame structure 316 closes in around cargo 306 (operation 2806). Next, engagement units associated with forklift units 352 may attach to the wheels and/or tracks for cargo 306 (operation 2808). The, pressure is applied against the wheels and/or tracks using the engagement units to secure cargo 306 (operation 2810), with the process terminating thereafter.

Figure 29:
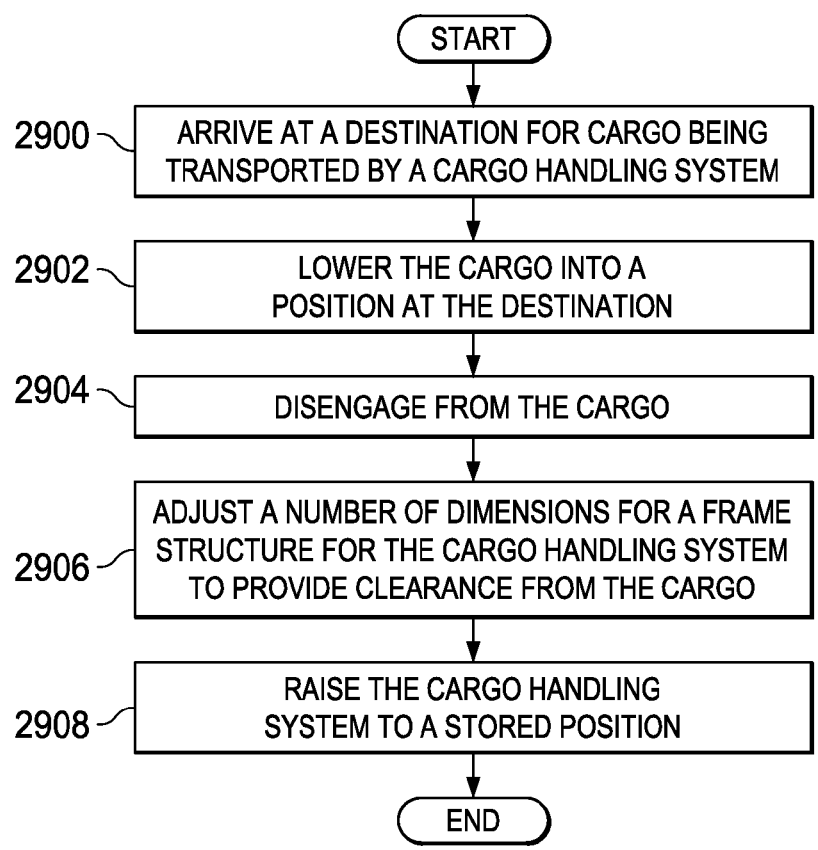
FIG. 29 is an illustration of a flowchart of a process for unloading cargo using a cargo handling system in accordance with an advantageous embodiment.

With reference now to FIG. 29, an illustration of a flowchart of a process for unloading cargo using a cargo handling system is depicted in accordance with an advantageous embodiment. The process illustrated in FIG. 29 may be implemented using cargo handling system 304 in cargo handling environment 300 in FIG. 3.

The process may begin by arriving at a destination for cargo 306 being transported by cargo handling system 304 (operation 2900). In operation 2900, aircraft 302 associated with cargo handling system 304 may hover over the destination area for cargo 306.

Cargo 306 may then be lowered into a position at the destination (operation 2902). In operation 2902, the position may be a position on the ground, on a platform, on a stage, or on some other suitable surface at the destination. Cargo handling system 304 may disengage from cargo 306 (operation 2904). Operation 2904 may involve disengaging at least one of pin system 338 and forklift system 340 from cargo 306.

Thereafter, number of dimensions 324 for frame structure 316 for cargo handling system 304 may be adjusted to provide clearance from cargo 306 (operation 2906). Clearance from cargo 306 may allow frame structure 316 to be raised above cargo 306 without making contact with cargo 306. Cargo handling system 304 may then be raised to stored position 362 (operation 2908), with the process terminating thereafter. With cargo handling system 304 in stored position 362, aircraft 302 may proceed to a new location for picking up additional cargo.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, without limitation, in some illustrative examples, operation 2704 and operation 2706 in FIG. 27 may be performed at the same time. In other illustrative examples, operation 2704 in FIG. 27 may be performed prior to performing operation 2806 in FIG. 28. In other words, both a pin system and a forklift system may be used to engage cargo in other illustrative examples.

Thus, the different advantageous embodiments provide a method and apparatus for handling cargo. In one advantageous embodiment, an apparatus may comprise a frame structure and an engagement system. The frame structure may configure change in a number of dimensions to encompass cargo within an interior area of the frame. The engagement system may be configured to engage the cargo and hold the cargo within the interior area of the frame structure when the frame structure is moved away from the ground.

The description of the different advantageous embodiments has been presented for purposes of illustration and description and is not intended to be exhaustive or limited to the embodiments in the form disclosed. Many modifications and variations may be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a frame structure configured to change in a number of dimensions to encompass cargo, the frame structure including a first set of segments and members, at least one member disposed in a portion of at least one segment in the first set of segments and members, aligned on a first axis and the at least one segment configured to slide with respect to the at least one member along the first axis, and a second set of segments and members, at least one member disposed in a portion of at least one segment in the second set of segments and members, aligned on a second axis, and the at least one segment configured to slide with respect to the at least one member along the second axis;
   an engagement system configured to engage the cargo;
   a sensor system configured to detect a position of the cargo and the frame structure relative to each other; and
   a thruster system associated with the frame structure, wherein the thruster system is configured to generate thrust to move the frame structure linearly along the first axis and the second axis, wherein the first axis and the second axis are substantially at right angles to each other.

2. The apparatus of claim 1, wherein the frame structure encompasses the cargo within an interior area of the frame structure.

3. The apparatus of claim 2, wherein the engagement system is further configured to engage the cargo within the interior area of the frame structure when the frame structure is at least one of moved away from a ground, in a position on the ground, in a position over the ground, and moving towards the ground.

4. The apparatus of claim 1 further comprising:
   a cable system configured to connect the frame structure to an aircraft, the cable system configured to transition between a stored position and a lowered position.

5. The apparatus of claim 4, wherein the cable system comprises:
   a cable; and
   cable hooks.

6. The apparatus of claim 1 further comprising:
   a computer system configured to control operation of the frame structure and the engagement system.

7. The apparatus of claim 1, wherein the frame structure comprises:
   a frame having an interior area and configured to change in the number of dimensions, the first set of segments including a first set of members, the first set of segments and the first set of members configured such that the first set of members slide into the first set of segments along the first axis to change a length of the first set of segments and the first set of members, and the second set of segments including a second set of members, the second set of segments and the second set of members configured such that the second set of members slide into the second set of segments along the second axis to change a length of the second set of segments and the second set of members; and
   a motor system configured to change the number of dimensions of the frame.

8. The apparatus of claim 1, wherein the engagement system comprises a pin system and at least one of a forklift system, a hoist system, and an engagement member.

9. The apparatus of claim 8, wherein the cargo is a container with holes and the pin system comprises pin units and a movement system in which the movement system is configured to move the pin units to different positions on the frame structure and to move the pin units to engage the holes, and the sensor system configured to detect a size of the container.

10. The apparatus of claim 8, wherein the fork lift system comprises a number of forklift units.

11. The apparatus of claim 10, wherein the fork lift system further comprises a movement system configured to move the number of forklift units to different positions on a frame and to move the number of forklift units between a stored position and an active position, and the sensor system configured to detect a spacing to determine a desired position for the forklift units.

12. The apparatus of claim 10, wherein the cargo is a vehicle with wheels and the number of forklift units each have a set of tines configured to support a wheel in the wheels and an engagement unit configured to hold a side of the wheel.

13. The apparatus of claim 1, wherein the sensor system comprises:
  a number of sensors associated with at least one of the frame structure and an aircraft configured for connection to the frame structure.

14. The apparatus of claim 13, wherein the number of sensors comprises at least one of a number of cameras, a number of ultrasonic units, and a number of laser units.

15. The apparatus of claim 1 further comprising:
  an aircraft, wherein the frame structure is connected to the aircraft.

16. A cargo handling system for an aircraft, the cargo handling system comprising:
  a frame structure configured to change in a number of dimensions to encompass cargo within an interior area of the frame structure in which the frame structure comprises:
    a frame having the interior area and configured to change in the number of dimensions, the frame including a first set of segments and members aligned on a first axis, at least one member disposed within a portion of at least one segment in the first set of segments and members and the at least one member configured to slide into and out of the portion so as to change a length of the first set of segments and members along the first axis, and a second set of segments and members aligned on a second axis, at least one member disposed within a portion of at least one segment in the second set of segments and members, and the at least one member configured to slide into and out of the portion so as to change a length of the second set of segments and members along the second axis; and
    a motor system configured to change the number of dimensions of the frame structure;
  an engagement system configured to engage the cargo within the interior area of the frame structure when the frame structure is moved away from a ground in which the engagement system comprises a forklift system and at least one of a pin system, a hoist system, and an engagement member, the forklift system comprising a movement system configured to move a number of forklift units to different positions on the frame;
  a sensor system configured to detect a position of the cargo and the frame structure relative to each other in which the sensor system comprises a number of sensors associated with at least one of the frame and the aircraft configured for connection to the frame structure and in which the number of sensors comprises at least one of a number of cameras, a number of ultrasonic units, and a number of laser units;
  a thruster system associated with the frame structure in which the thruster system is configured to generate thrust to move the frame structure linearly along the first axis and the second axis, wherein the first axis and the second axis are substantially at right angles to each other;
  a cable system configured to connect the frame structure to the aircraft and comprising a cable and cable hooks; and
  a computer system configured to control operation of the frame structure and the engagement system.

17. A cargo handling system for a vehicle, the cargo handling system comprising:
  a substantially quadrilateral frame structure configured to change in a number of dimensions to encompass cargo within an interior area of the frame structure in which the frame structure comprises:
    a frame having the interior area and configured to change in the number of dimensions, the frame including a first set of segments and members aligned on a first axis and a second set of segments and members aligned on a second axis, the first set of segments and members configured such that the first set of members slide into the first set of segments along the first axis to change a length of the first set of segments and members, the second set of segments and members configured such that the second set of members slide into the second set of segments along the second axis to change a length of the second set of segments and members, the first axis and the second axis set at substantially right angles in the substantially quadrilateral frame structure; and
    a motor system configured to move the first set of segments and members and the second set of segments and members so as to change the number of dimensions of the frame structure;
  an engagement system configured to engage the cargo within the interior area of the frame structure when the frame structure is moved away from a ground in which the engagement system comprises a pin system and a forklift system, the forklift system comprising a movement system configured to move a number of forklift units to different positions on the frame;
  a sensor system configured to detect a position of the cargo and the frame structure relative to each other and configured to detect a size of an interior area of the frame structure relative to the cargo, and in which the sensor system comprises a number of sensors associated with at least one of the frame and the aircraft configured for connection to the frame structure and in which the number of sensors comprises at least one of a number of cameras, a number of ultrasonic units, and a number of laser units;
  a thruster system associated with the frame structure in which the thruster system is configured to generate thrust to move the frame structure linearly along the first axis and the second axis, wherein the first axis and the second axis are substantially at right angles to each other;
  a cable system configured to connect the frame structure to the vehicle and comprising a cable and cable hooks, the cable system configured to transition between a stored position and a lowered position; and
  a computer system configured to control operation of the frame structure and the engagement system.

18. The cargo handling system of claim 17, wherein the engagement system further comprises a hoist system and an engagement member.

* * * * *